US010412008B2

(12) United States Patent
Tan et al.

(10) Patent No.: US 10,412,008 B2
(45) Date of Patent: Sep. 10, 2019

(54) PACKET PROCESSING METHOD, APPARATUS, AND SYSTEM

(71) Applicant: Huawei Technologies Co., Ltd., Shenzhen (CN)

(72) Inventors: Shiyong Tan, Beijing (CN); Hui Ni, Beijing (CN); Hui Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 15/199,494

(22) Filed: Jun. 30, 2016

(65) Prior Publication Data

US 2016/0315864 A1 Oct. 27, 2016

Related U.S. Application Data

(63) Continuation of application No. PCT/CN2013/091187, filed on Dec. 31, 2013.

(51) Int. Cl.

*H04L 12/803* (2013.01)
*H04L 12/24* (2006.01)
*H04L 12/851* (2013.01)

(52) U.S. Cl.

CPC ........ *H04L 47/125* (2013.01); *H04L 41/0823* (2013.01); *H04L 47/2483* (2013.01)

(58) Field of Classification Search

None
See application file for complete search history.

(56) References Cited

U.S. PATENT DOCUMENTS

| | | | | |
|---|---|---|---|---|
| 6,141,410 | A | 10/2000 | Ginzboorg | |
| 2011/0161494 | A1* | 6/2011 | Mcdysan | H04L 45/306 709/225 |
| 2013/0223444 | A1 | 8/2013 | Liljenstolpe et al. | |
| 2013/0308645 | A1 | 11/2013 | Karino | |
| 2014/0092899 | A1* | 4/2014 | Krishna | H04L 61/2517 370/389 |
| 2014/0233385 | A1* | 8/2014 | Beliveau | H04L 47/122 370/235 |
| 2015/0092551 | A1* | 4/2015 | Moisand | H04L 12/4633 370/235 |

(Continued)

FOREIGN PATENT DOCUMENTS

| | | | |
|---|---|---|---|
| CN | 101009662 | A | 8/2007 |
| CN | 102404179 | A | 4/2012 |

(Continued)

*Primary Examiner* — Kodzovi Acolatse
*Assistant Examiner* — The Hy Nguyen
(74) *Attorney, Agent, or Firm* — Slater Matsil, LLP

(57) ABSTRACT

A method includes receiving, by an ingress network element, a data packet, wherein an ingress flow entry is stored in the ingress network element. The ingress flow entry comprises flow description information and a processing network element indication, where the flow description information matches the data packet, and the processing network element indication is used to indicate a processing network element that processes the data packet after the ingress network element. The method further includes sending, by the ingress network element, the data packet to the processing network element according to the ingress flow entry, so that the processing network element performs context processing on the data packet.

18 Claims, 11 Drawing Sheets

(56) References Cited

U.S. PATENT DOCUMENTS

2015/0124815 A1* 5/2015 Beliveau ................. H04L 45/38
370/392

FOREIGN PATENT DOCUMENTS

| | | | |
|---|---|---|---|
| CN | 103152251 | A | 6/2013 |
| CN | 103370911 | A | 10/2013 |
| RU | 2146427 | C1 | 3/2000 |
| WO | 2012111051 | A1 | 8/2012 |

* cited by examiner

PACKET PROCESSING METHOD, APPARATUS, AND SYSTEM

CROSS-REFERENCE TO RELATED APPLICATIONS

This application is a continuation of International Application No. PCT/CN2013/091187, filed on Dec. 31, 2013, which is hereby incorporated by reference in its entirety.

TECHNICAL FIELD

The present disclosure relates to the communications field, and in particular embodiments, to a packet processing method, an apparatus, and a system.

BACKGROUND

In a current communications network, there are many complex network devices, such as a router, a network management system, a switch, a firewall, and various types of servers. These devices support various types of network protocols, so as to implement interworking between network elements. Because each device has its own independent control module, network deployment and management are very complex due to such a distributed deployment of control modules. To modify a control parameter or upgrade a control module, a network operator needs to separately operate each device.

To achieve flexible and manageable deployment of network elements, a concept of software-defined networking (SDN for short) is put forward in the industry. By means of SDN, control logic of a network element is decoupled from a forwarding function, and the control logic is deployed in a centralized manner, so that network control and maintenance work can be implemented simply by operating a control plane device. In this way, network management efficiency is improved, and the forwarding-plane device is simpler, which helps achieve high performance and reusability of the forwarding device. Currently, the idea of SDN is widely applied to data center networks and telecommunications networks.

The prior art provides a method for decoupling control from forwarding in SDN, where a network includes a control plane and a forwarding-plane device, and the control plane controls the forwarding-plane device by delivering flow match information and a corresponding context, so as to process a data packet of a user. The flow match information is used to determine a service flow to which the packet belongs, and the context indicates a particular processing function. Each service flow may correspond to or may be associated with multiple contexts, and these contexts are independent from each other, so as to achieve relative independence between various types of processing of the flow-granularity packet, thereby making parallel processing and processing capability expansion easier.

In the prior art, because a forwarding-plane device processes all packets according to contexts, there is a relatively high requirement on the forwarding-plane device, and load on the forwarding-plane device is relatively great, which is bad for improvement of overall network performance.

SUMMARY

Embodiments of the present invention relate to the communications field, and provide a packet processing method, so that context processing can be separately performed on a packet by using distributed forwarding-plane devices, so as to improve load balance during the context processing of the network packet.

According to a first aspect, a packet processing system is provided, including the following. An ingress network element, configured to receive a data packet from the outside of the packet processing system, and send the data packet to a processing network element according to an ingress flow entry, where the ingress flow entry includes flow description information and a processing network element indication, the flow description information matches the data packet, and the processing network element indication is used to indicate the processing network element that processes the data packet after the ingress network element. The processing network element is configured to receive the data packet from the ingress network element, and perform context processing on the data packet according to a context processing indication. The context processing indication is used to indicate the context processing performed on the data packet.

With reference to the first aspect, in an implementation, the ingress flow entry further includes an encapsulation flow identifier, where the encapsulation flow identifier is used to identify a service flow to which the data packet belongs. The ingress network element is further configured to attach the encapsulation flow identifier to the data packet. The processing network element is configured to acquire the encapsulation flow identifier from the data packet, acquire a processing flow entry according to the encapsulation flow identifier, and perform the context processing on the data packet according to the processing flow entry, where the processing flow entry includes a match flow identifier and the context processing indication, and the match flow identifier matches the encapsulation flow identifier.

In an implementation of the first aspect, the ingress flow entry further includes an ingress encapsulation indication, where the ingress encapsulation indication is used to indicate attaching the encapsulation flow identifier to the data packet. The ingress network element is configured to attach the encapsulation flow identifier to the data packet according to the ingress encapsulation indication.

In an implementation of the first aspect, the processing network element is further configured to: when the processed data packet does not include the encapsulation flow identifier, attach a flow identifier to the processed data packet, where the flow identifier is the encapsulation flow identifier, or when the processing flow entry further includes a new encapsulation flow identifier, the flow identifier is the new encapsulation flow identifier.

In an implementation of the first aspect, the processing flow entry further includes a processing encapsulation indication; the processing encapsulation indication is used to indicate attaching the flow identifier to the processed data packet. The processing network element is further configured to attach the flow identifier to the processed data packet according to the processing encapsulation indication.

In an implementation of the first aspect, when the processing flow entry does not include a reprocessing network element indication, the processing network element is further configured to send the processed data packet to the outside of the packet processing system; or when the processing flow entry further includes a reprocessing network element indication, the processing network element is further configured to send the processed data packet to a next processing network element according to the reprocessing network element indication, where the reprocessing network element indication is used to indicate the next processing network element that processes the data packet after the processing network element.

In an implementation of the first aspect, the ingress flow entry and the processing flow entry are locally configured or sent by a control network element, where the control network element is configured to control forwarding or processing performed by the ingress network element and the processing network element on the data packet.

With reference to the first aspect, in an implementation, the processing network element indication includes a context processing indication list, where the context processing indication list includes the context processing indication. The ingress network element is configured to attach the context processing indication list to the data packet, determine that next context processing to be performed on the data packet is the context processing indicated by the context processing indication, and send the data packet to the processing network element according to a correspondence between the context processing indication and the processing network element. The processing network element is configured to acquire the context processing indication list from the data packet, and perform the context processing on the data packet according to the context processing indication.

In an implementation of the first aspect, the context processing indication list further includes addressing information of the processing network element, where the context processing indication corresponds to the addressing information of the processing network element. The ingress network element is configured to send the data packet to the processing network element according to the addressing information, which corresponds to the context processing indication, of the processing network element.

In an implementation of the first aspect, when the context processing indication list does not include another context processing indication, the processing network element is further configured to send the processed data packet to the outside of the packet processing system; or when the context processing indication list further includes another context processing indication, the processing network element is further configured to determine that next context processing to be performed on the data packet is context processing indicated by the another context processing indication, and after the processing network element performs the context processing on the data packet, send the processed data packet to another processing network element according to a correspondence between the another context processing indication and the another processing network element, where the another context processing indication is used to indicate the context processing performed on the data packet.

In an implementation of the first aspect, the context processing indication list further includes addressing information of the another processing network element, where the another context processing indication corresponds to the addressing information of the another processing network element. The processing network element is configured to send the processed data packet to the another processing network element according to the addressing information, which corresponds to the another context processing indication, of the another processing network element.

In an implementation of the first aspect, the ingress flow entry is locally configured or sent by a control network element, where the control network element is configured to control forwarding performed by the ingress network element on the data packet.

In an implementation of the first aspect, the ingress flow entry further includes an ingress context processing indication, where the ingress context processing indication is used to indicate context processing performed on the data packet. The ingress network element is further configured to perform the context processing on the data packet according to the ingress context processing indication.

According to a second aspect, an ingress network element is provided, including the following. A receiving unit, configured to receive a data packet. A sending unit, configured to send the data packet received by the receiving unit to a processing network element according to an ingress flow entry, so that the processing network element performs context processing on the data packet, where the ingress flow entry includes flow description information and a processing network element indication, the flow description information matches the data packet, and the processing network element indication is used to indicate the processing network element that processes the data packet after the ingress network element.

With reference to the second aspect, in an implementation, the ingress flow entry further includes an encapsulation flow identifier, where the encapsulation flow identifier is used to identify a service flow to which the data packet belongs. The ingress network element further includes a flow identifier encapsulation unit, configured to attach the encapsulation flow identifier to the data packet, so that the processing network element acquires the encapsulation flow identifier from the data packet, acquires a processing flow entry according to the encapsulation flow identifier, and performs the context processing on the data packet according to the processing flow entry.

In an implementation of the second aspect, the ingress flow entry further includes an ingress encapsulation indication, where the ingress encapsulation indication is used to indicate attaching the encapsulation flow identifier to the data packet. The flow identifier encapsulation unit is configured to attach the encapsulation flow identifier to the data packet according to the ingress encapsulation indication.

In an implementation of the second aspect, the ingress flow entry is locally configured or sent by a control network element, where the control network element is configured to control forwarding or processing performed by the ingress network element on the data packet.

With reference to the second aspect, an implementation, the processing network element indication includes a context processing indication list, where the context processing indication list includes the context processing indication. The ingress network element further includes a processing indication attaching unit, configured to attach the context processing indication list to the data packet. The sending unit is configured to determine that next context processing to be performed on the data packet is the context processing indicated by the context processing indication, and send the data packet to the processing network element according to a correspondence between the context processing indication and the processing network element.

In an implementation of the second aspect, the context processing indication list further includes addressing information of the processing network element, where the context processing indication corresponds to the addressing information of the processing network element. The sending unit is configured to send the data packet to the processing network element according to the addressing information, which corresponds to the context processing indication, of the processing network element.

In an implementation of the second aspect, the ingress flow entry is locally configured or sent by a control network element, where the control network element is configured to control forwarding performed by the ingress network element on the data packet.

In an implementation of the second aspect, the ingress flow entry further includes an ingress context processing indication, where the ingress context processing indication is used to indicate context processing performed on the data packet. The ingress network element further includes a processing unit. The processing unit is configured to perform the context processing on the data packet according to the ingress context processing indication.

According to a third aspect, a processing network element is provided, including the following. A receiving unit, configured to receive a data packet; and a processing unit, configured to perform, according to a context processing indication, context processing on the data packet received by the receiving unit, where the context processing indication is used to indicate the context processing performed on the data packet.

With reference to the third aspect, in an implementation, the processing unit is configured to acquire an encapsulation flow identifier from the data packet, acquire a processing flow entry according to the encapsulation flow identifier, and perform the context processing on the data packet according to the processing flow entry, where the encapsulation flow identifier is used to identify a service flow to which the data packet belongs, the processing flow entry includes a match flow identifier and the context processing indication, and the match flow identifier matches the encapsulation flow identifier.

In an implementation of the third aspect, when the processed data packet does not include the encapsulation flow identifier, the processing unit is further configured to attach a flow identifier to the processed data packet, where the flow identifier is the encapsulation flow identifier, or when the processing flow entry further includes a new encapsulation flow identifier, the flow identifier is the new encapsulation flow identifier.

In an implementation of the third aspect, the processing flow entry further includes a processing encapsulation indication; the processing encapsulation indication is used to indicate attaching the flow identifier to the processed data packet. The processing unit is configured to attach the flow identifier to the processed data packet according to the processing encapsulation indication.

In an implementation of the third aspect, the processing network element further includes a sending unit. When the processing flow entry does not include a reprocessing network element indication, the sending unit sends the data packet processed by the processing unit to the outside; or when the processing flow entry further includes a reprocessing network element indication, the sending unit sends the data packet processed by the processing unit to a next processing network element according to the reprocessing network element indication, where the reprocessing network element indication is used to indicate the next processing network element that processes the data packet after the processing network element.

In an implementation of the third aspect, the processing flow entry is locally configured or sent by a control network element, where the control network element is configured to control forwarding or processing performed by the processing network element on the data packet.

In an implementation of the third aspect, the processing unit is configured to acquire a context processing indication list from the data packet, where the context processing indication list includes the context processing indication, and perform the context processing on the data packet according to the context processing indication.

In an implementation of the third aspect, the processing network element further includes a sending unit. When the context processing indication list does not include another context processing indication, the sending unit sends the data packet processed by the processing unit to the outside; or when the context processing indication list further includes another context processing indication, the sending unit determines that next context processing to be performed on the data packet is context processing indicated by the another context processing indication, and after the processing unit performs the context processing on the data packet, sends the data packet processed by the processing unit to another processing network element according to a correspondence between the another context processing indication and the another processing network element, where the another context processing indication is used to indicate the context processing performed on the data packet.

In an implementation of the third aspect, the context processing indication list further includes addressing information of the another processing network element, where the another context processing indication corresponds to the addressing information of the another processing network element. The sending unit is configured to send the data packet processed by the processing unit to the another processing network element according to the addressing information, which corresponds to the another context processing indication, of the another processing network element.

According to a fourth aspect, a packet processing method is provided, including the following. Receiving, by an ingress network element, a data packet, where an ingress flow entry is stored in the ingress network element, the ingress flow entry includes flow description information and a processing network element indication, the flow description information matches the data packet, and the processing network element indication is used to indicate a processing network element that processes the data packet after the ingress network element; and sending, by the ingress network element, the data packet to the processing network element according to the ingress flow entry, so that the processing network element performs context processing on the data packet.

With reference to the fourth aspect, in an implementation, the ingress flow entry further includes an encapsulation flow identifier, where the encapsulation flow identifier is used to identify a service flow to which the data packet belongs; and the method further includes: attaching, by the ingress network element, the encapsulation flow identifier to the data packet, so that the processing network element acquires the encapsulation flow identifier from the data packet, acquires a processing flow entry according to the encapsulation flow identifier, and performs the context processing on the data packet according to the processing flow entry.

In an implementation of the fourth aspect, the ingress flow entry further includes an ingress encapsulation indication, where the ingress encapsulation indication is used to indicate attaching the encapsulation flow identifier to the data packet. The attaching, by the ingress network element, the encapsulation flow identifier to the data packet includes: attaching, by the ingress network element, the encapsulation flow identifier to the data packet according to the ingress encapsulation indication.

In an implementation of the fourth aspect, the ingress flow entry is locally configured or sent by a control network element, where the control network element is configured to control forwarding or processing performed by the ingress network element on the data packet.

With reference to the fourth aspect, in an implementation, the processing network element indication includes a context processing indication list, where the context processing indication list includes the context processing indication. The method further includes: attaching, by the ingress network element, the context processing indication list to the data packet. The sending, by the ingress network element, the data packet to the processing network element according to the ingress flow entry includes: determining, by the ingress network element, that next context processing to be performed on the data packet is the context processing indicated by the context processing indication, and sending the data packet to the processing network element according to a correspondence between the context processing indication and the processing network element.

In an implementation of the fourth aspect, the context processing indication list further includes addressing information of the processing network element, where the context processing indication corresponds to the addressing information of the processing network element. The sending the data packet to the processing network element according to a correspondence between the context processing indication and the processing network element includes: sending, by the ingress network element, the data packet to the processing network element according to the addressing information, which corresponds to the context processing indication, of the processing network element.

In an implementation of the fourth aspect, the ingress flow entry is locally configured or sent by a control network element, where the control network element is configured to control forwarding performed by the ingress network element on the data packet.

With reference to the fourth aspect, in an implementation, the ingress flow entry further includes an ingress context processing indication, where the ingress context processing indication is used to indicate context processing performed on the data packet. The method further includes: performing, by the ingress network element, the context processing on the data packet according to the ingress context processing indication.

According to a fifth aspect, a packet processing method is provided, including the following. Receiving, by a processing network element, a data packet; and performing context processing on the data packet according to a context processing indication, where the context processing indication is used to indicate the context processing performed on the data packet.

With reference to the fifth aspect, in an implementation, the performing context processing on the data packet according to a context processing indication includes: acquiring, by the processing network element, an encapsulation flow identifier from the data packet, acquiring a processing flow entry according to the encapsulation flow identifier, and performing the context processing on the data packet according to the processing flow entry, where the encapsulation flow identifier is used to identify a service flow to which the data packet belongs, the processing flow entry includes a match flow identifier and the context processing indication, and the match flow identifier matches the encapsulation flow identifier.

In an implementation of the fifth aspect, the method further includes: when the processed data packet does not include the encapsulation flow identifier, attaching, by the processing network element, a flow identifier to the processed data packet, where the flow identifier is the encapsulation flow identifier, or when the processing flow entry further includes a new encapsulation flow identifier, the flow identifier is the new encapsulation flow identifier.

In an implementation of the fifth aspect, the processing flow entry further includes a processing encapsulation indication; the processing encapsulation indication is used to indicate attaching the flow identifier to the processed data packet. The method further includes: attaching, by the processing network element, the flow identifier to the processed data packet according to the processing encapsulation indication.

In an implementation of the fifth aspect, the method further includes: when the processing flow entry does not include a reprocessing network element indication, sending, by the processing network element, the processed data packet to the outside; or when the processing flow entry further includes a reprocessing network element indication, sending, by the processing network element, the processed data packet to a next processing network element according to the reprocessing network element indication, where the reprocessing network element indication is used to indicate the next processing network element that processes the data packet after the processing network element.

In an implementation of the fifth aspect, the processing flow entry is locally configured or sent by a control network element, where the control network element is configured to control forwarding or processing performed by the processing network element on the data packet.

With reference to the fifth aspect, in an implementation, the performing context processing on the data packet according to a context processing indication includes: acquiring, by the processing network element, a context processing indication list from the data packet, where the context processing indication list includes the context processing indication, and performing the context processing on the data packet according to the context processing indication.

In an implementation of the fifth aspect, the method further includes: when the context processing indication list does not include another context processing indication, sending, by the processing network element, the processed data packet to the outside; or when the context processing indication list further includes another context processing indication, determining, by the processing network element, that next context processing to be performed on the data packet is context processing indicated by the another context processing indication, and after the processing network element performs the context processing on the data packet, sending the processed data packet to another processing network element according to a correspondence between the another context processing indication and the another processing network element, where the another context processing indication is used to indicate the context processing performed on the data packet.

In an implementation of the fifth aspect, the context processing indication list further includes addressing information of the another processing network element, where the another context processing indication corresponds to the addressing information of the another processing network element. The sending the processed data packet to another processing network element includes: sending, by the processing network element, the processed data packet to the another processing network element according to the addressing information, which corresponds to the another context processing indication, of the another processing network element.

According to the packet processing method, the apparatus, and the system that are provided in the foregoing technical solutions, a packet is forwarded to different network elements for context processing, so that context processing can be separately performed on the packet by using distributed forwarding-plane devices, so as to improve load balance during the context processing of the network packet.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention.

Figure 1:
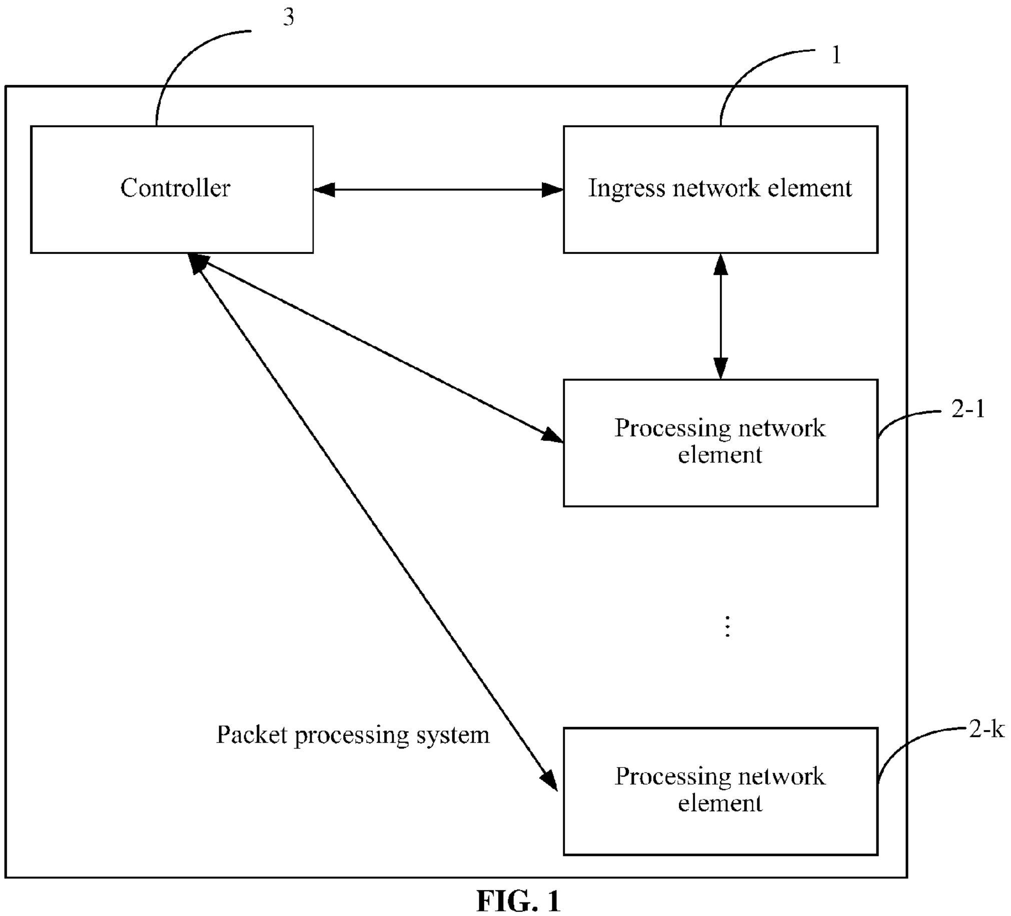
FIG. 1 is a schematic structural diagram of a communications system according to an embodiment of the present invention.

An embodiment of the present invention is applied to software-defined networking (SDN for short), and provides a packet processing system. As shown in FIG. 1, the system includes: an ingress network element 1 and at least one processing network element (2-1 to 2-*k*).

The ingress network element 1 is configured to receive a data packet from the outside of the packet processing system, and send the data packet to a processing network element 2-1 (certainly, the processing network element herein may be any one of 2-1 to 2-*k*, and 2-1 is used herein as an example) according to an ingress flow entry. The ingress flow entry includes flow description information and a processing network element indication, the flow description information matches the data packet, and the processing network element indication is used to indicate the processing network element 2-1 that processes the data packet after the ingress network element 1.

The processing network element 2-1 is configured to receive the data packet from the ingress network element 1, and perform context processing on the data packet according to a context processing indication.

The context processing indication is used to indicate the context processing performed on the data packet.

According to the packet processing system provided in this embodiment of the present invention, a packet is forwarded to different network elements for context processing, so that context processing can be separately performed on the packet by using distributed forwarding-plane devices, so as to improve load balance during the context processing of the network packet.

In an implementation provided by this embodiment of the present invention, optionally, the ingress flow entry further includes an encapsulation flow identifier, where the encapsulation flow identifier is used to identify a service flow to which the data packet belongs.

The ingress network element 1 is further configured to attach the encapsulation flow identifier to the data packet.

The processing network element 2-1 is configured to acquire the encapsulation flow identifier from the data packet, acquire a processing flow entry according to the encapsulation flow identifier, and perform the context processing on the data packet according to the processing flow entry, where the processing flow entry includes a match flow identifier and the context processing indication, and the match flow identifier matches the encapsulation flow identifier.

Optionally, the ingress flow entry further includes an ingress encapsulation indication, where the ingress encapsulation indication is used to indicate attaching the encapsulation flow identifier to the data packet. Correspondingly, the ingress network element 1 is configured to attach the encapsulation flow identifier to the data packet according to the ingress encapsulation indication.

Optionally, the processing network element 2-1 is further configured to: when the processed data packet does not include the encapsulation flow identifier, attach a flow identifier to the processed data packet, where the flow identifier is the encapsulation flow identifier, or when the processing flow entry further includes a new encapsulation flow identifier, the flow identifier is the new encapsulation flow identifier.

Optionally, the processing flow entry further includes a processing encapsulation indication; the processing encapsulation indication is used to indicate attaching the flow identifier to the processed data packet. Correspondingly, the processing network element 2-1 is further configured to attach the flow identifier to the processed data packet according to the processing encapsulation indication.

Optionally, when the processing flow entry does not include a reprocessing network element indication, the processing network element 2-1 is further configured to send the processed data packet to the outside of the packet processing system; or when the processing flow entry further includes a reprocessing network element indication, the processing network element 2-1 is further configured to send the processed data packet to a next processing network element 2-2 according to the reprocessing network element indication, where the reprocessing network element indication is used to indicate the next processing network element that processes the data packet after the processing network element 2-1.

Optionally, the system further includes a control network element 3, and the ingress flow entry and the processing flow entry are locally configured or are sent by the control network element 3, where the control network element 3 is configured to control forwarding or processing performed by the ingress network element 1 and the processing network element 2-1 on the data packet.

In another implementation manner provided by this embodiment of the present invention, optionally, the processing network element indication includes a context processing indication list, where the context processing indication list includes the context processing indication. Correspondingly, the ingress network element 1 is configured to attach the context processing indication list to the data packet, determine that next context processing to be performed on the data packet is the context processing indicated by the context processing indication, and send the data packet to the processing network element 2-1 according to a correspondence between the context processing indication and the processing network element 2-1. Correspondingly, the processing network element 2-1 is configured to acquire the context processing indication list from the data packet, and perform the context processing on the data packet according to the context processing indication.

Optionally, the context processing indication list further includes addressing information of the processing network element 2-1, where the context processing indication corresponds to the addressing information of the processing network element 2-1. Correspondingly, the ingress network element 1 is configured to send the data packet to the processing network element 2-1 according to the addressing information, which corresponds to the context processing indication, of the processing network element 2-1.

Optionally, when the context processing indication list does not include another context processing indication, the processing network element 2-1 is further configured to send the processed data packet to the outside of the packet processing system; or when the context processing indication list further includes another context processing indication, the processing network element 2-1 is further configured to determine that next context processing to be performed on the data packet is context processing indicated by the another context processing indication, and after the processing network element performs the context processing on the data packet, send the processed data packet to another processing network element 2-2 according to a correspondence between the another context processing indication and the another processing network element, where the another context processing indication is used to indicate the context processing performed on the data packet.

Optionally, the context processing indication list further includes addressing information of the another processing network element 2-2, where the another context processing indication corresponds to the addressing information of the another processing network element 2-2. Correspondingly, the processing network element 2-1 is configured to send the processed data packet to the another processing network element 2-2 according to the addressing information, which corresponds to the another context processing indication, of the another processing network element 2-2.

Optionally, the ingress flow entry is locally configured or sent by a control network element 2, where the control network element 2 is configured to control forwarding performed by the ingress network element on the data packet.

In the foregoing two implementation manners, optionally, the ingress flow entry further includes an ingress context processing indication, where the ingress context processing indication is used to indicate context processing performed on the data packet. Correspondingly, the ingress network element 1 is further configured to perform the context processing on the data packet according to the ingress context processing indication.

According to the packet processing system provided in this embodiment of the present invention, a packet is forwarded to different network elements for context processing, so that context processing can be separately performed on the packet by using distributed forwarding-plane devices, so as to improve load balance during the context processing of the network packet.

Figure 2:
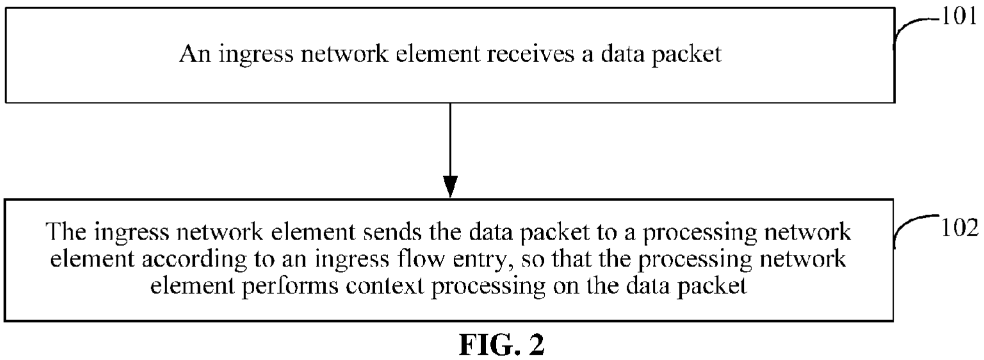
FIG. 2 is a schematic flowchart of a packet processing method according to an embodiment of the present invention.

An embodiment of the present invention provides a packet processing method, which is implemented by using the foregoing packet processing system. As shown in FIG. 2, from the perspective of an ingress network element, the method includes the following steps.

101: An ingress network element receives a data packet.

In step 101, the ingress network element receives a data packet from the outside of a packet processing system, where an ingress flow entry is stored in the ingress network element, the ingress flow entry includes flow description information and a processing network element indication, the flow description information matches the data packet, and the processing network element indication is used to indicate a processing network element that processes the data packet after the ingress network element.

102: The ingress network element sends the data packet to the processing network element according to the ingress flow entry, so that the processing network element performs context processing on the data packet.

The flow description information may be a type of information that includes a packet characteristic. When the data packet conforms to packet characteristic information included in the flow description information, it is considered that the data packet matches the flow description information.

For example, the flow description information may include one or a combination of packet characteristic fields such as a source MAC (Media Access Control) address, a destination MAC address, a source IP (Internet Protocol) address, a destination IP address, a source port number, a destination port number, an MPLS Label (multi-protocol label switching label), a ToS (type of service), an IPv6 flow label (Internet Protocol version 6 flow label), a GRE key (Generic Routing Encapsulation key), and a GTP TEID (general packet radio service tunneling protocol tunnel endpoint identifier), and is used to determine whether the packet belongs to a service flow to be processed this time.

Figure 3:
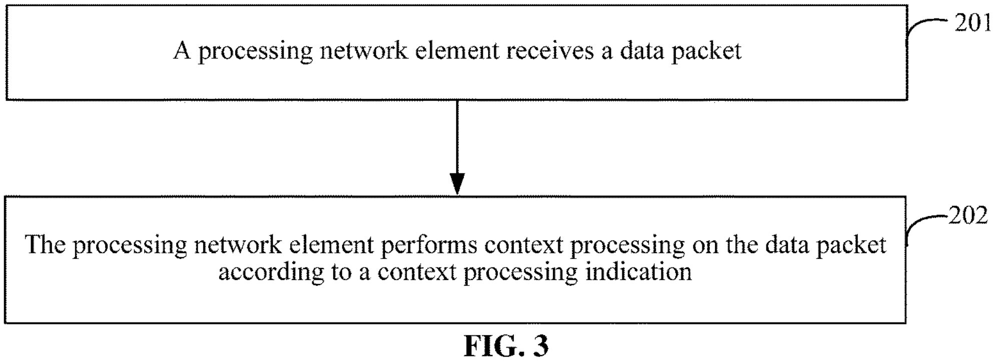
FIG. 3 is a schematic flowchart of another packet processing method according to an embodiment of the present invention.

An embodiment of the present invention provides another packet processing method, which is implemented by using the foregoing packet processing system. As shown in FIG. 3, from the perspective of a processing network element, the method includes the following steps.

201: A processing network element receives a data packet from an ingress network element.

202: The processing network element performs context processing on the data packet according to a context processing indication.

The context processing indication is used to indicate the context processing performed on the data packet.

According to the packet processing method provided in this embodiment of the present invention, a packet is forwarded to different network elements for context processing, so that context processing can be separately performed on the packet by using distributed forwarding-plane devices, so as to improve load balance during the context processing of the network packet.

Figure 4:
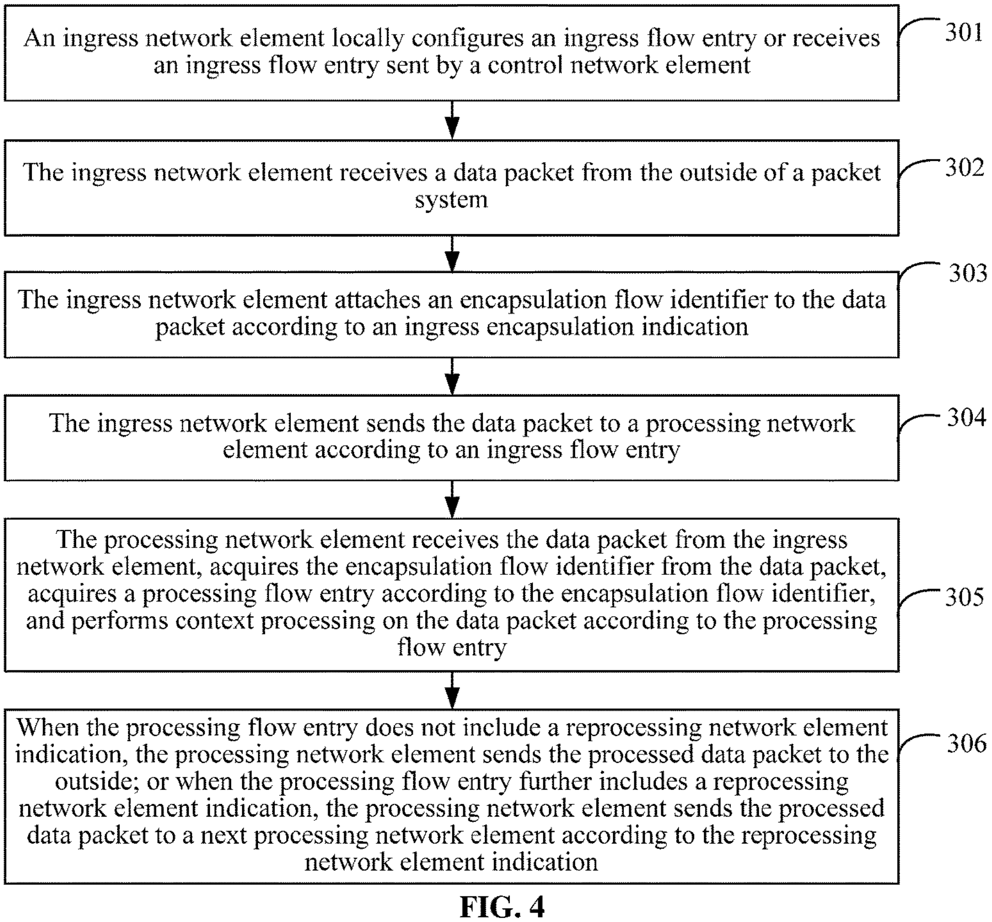
FIG. 4 is a schematic flowchart of a packet processing method according to another embodiment of the present invention.

As shown in FIG. 4, an embodiment of the present invention provides a packet processing method, which is implemented by using the foregoing packet processing system and includes the following steps.

301: An ingress network element locally configures an ingress flow entry or receives an ingress flow entry sent by a control network element.

The control network element is configured to control forwarding or processing performed by the ingress network element and a processing network element on a data packet. The ingress flow entry includes: flow description information, a processing network element indication, an encapsulation flow identifier and an encapsulation indication. The flow description information matches the data packet. The processing network element indication is used to indicate the processing network element that processes the data packet after the ingress network element. For example, the flow description information may include one or a combination of packet characteristic fields such as a source MAC (Media Access Control) address, a destination MAC address, a source IP (Internet Protocol) address, a destination IP address, a source port number, a destination port number, an MPLS Label (multi-protocol label switching label), a ToS (type of service), an IPv6 flow label (Internet Protocol version 6 flow label), a GRE key (Generic Routing Encapsulation key), and a GTP TEID (general packet radio service tunneling protocol tunnel endpoint identifier), and is used to determine whether the packet belongs to a service flow to be processed this time.

302: The ingress network element receives the data packet from the outside of a packet processing system.

By means of step 302, the ingress network element only has a function of receiving and sending the data packet, and the ingress network element and a processing network element are separately deployed in terms of function. Further, optionally, the ingress flow entry further includes an ingress context processing indication, where the ingress context processing indication is used to indicate context processing performed on the data packet. Step 302 further includes: performing, by the ingress network element, the context processing on the data packet according to the ingress context processing indication. In this case, the ingress network element has a capability of performing context processing on the packet, that is, in this case, the ingress network element and a processing network element are deployed together, and functions of the ingress network element include a function of a processing network element.

303: The ingress network element attaches the encapsulation flow identifier to the data packet according to the ingress encapsulation indication.

In the present disclosure, encapsulation performed according to the ingress encapsulation indication refers to adding information that needs to be attached, for example, the encapsulation flow identifier, to the packet, where the encapsulation flow identifier is used to identify a service flow to which the data packet belongs. A specific encapsulation manner may be a protocol encapsulation manner that uses GRE (Generic Routing Encapsulation), GTP (general packet radio service tunneling protocol), VLAN (virtual local area network), MPLS (Multiprotocol Label Switching), or the like, or another standard or self-defined format may be used, which is not limited in the present disclosure.

304: The ingress network element sends the data packet to the processing network element according to the ingress flow entry.

In step 304, because the processing network element indication is used to indicate the processing network element that processes the data packet after the ingress network element, the step 304 includes: sending, by the ingress network element, the data packet to the processing network element according to the processing network element indication, where the processing network element indication may be forwarding information such as an MAC address, an IP address, a domain name, or a self-defined identifier of the processing network element.

305: The processing network element receives the data packet from the ingress network element, acquires the encapsulation flow identifier from the data packet, acquires a processing flow entry according to the encapsulation flow identifier, and performs the context processing on the data packet according to the processing flow entry.

The processing flow entry includes a match flow identifier and a context processing indication, and the match flow identifier matches the encapsulation flow identifier.

Optionally, step 305 further includes: when the processed data packet does not include the encapsulation flow identifier, attaching a flow identifier to the processed data packet, where the flow identifier is the encapsulation flow identifier, or when the processing flow entry further includes a new encapsulation flow identifier, the flow identifier is the new encapsulation flow identifier.

Optionally, the processing flow entry further includes a processing encapsulation indication; the processing encapsulation indication is used to indicate attaching the flow identifier to the processed data packet; and the foregoing encapsulation process of the processed data packet is as follows: attaching, by the processing network element, the flow identifier to the processed data packet according to the processing encapsulation indication.

306: When the processing flow entry does not include a reprocessing network element indication, the processing network element sends the processed data packet to the outside; or when the processing flow entry further includes a reprocessing network element indication, the processing network element sends the processed data packet to a next processing network element according to the reprocessing network element indication.

The reprocessing network element indication is used to indicate the next processing network element that processes the data packet after the processing network element.

Because step 305 includes a process in which the processing network element encapsulates the processed data packet, in step 306, regardless of whether the processing network element sends the processed data packet to the outside of the packet processing system or the processing network element sends the processed data packet to the next processing network element according to the reprocessing network element indication, the processed data packet includes an attached flow identifier.

According to the packet processing method provided in this embodiment of the present invention, a packet is forwarded to different network elements for context processing, so that context processing can be separately performed on the packet by using distributed forwarding-plane devices, so as to improve load balance during the context processing of the network packet.

Figure 5:
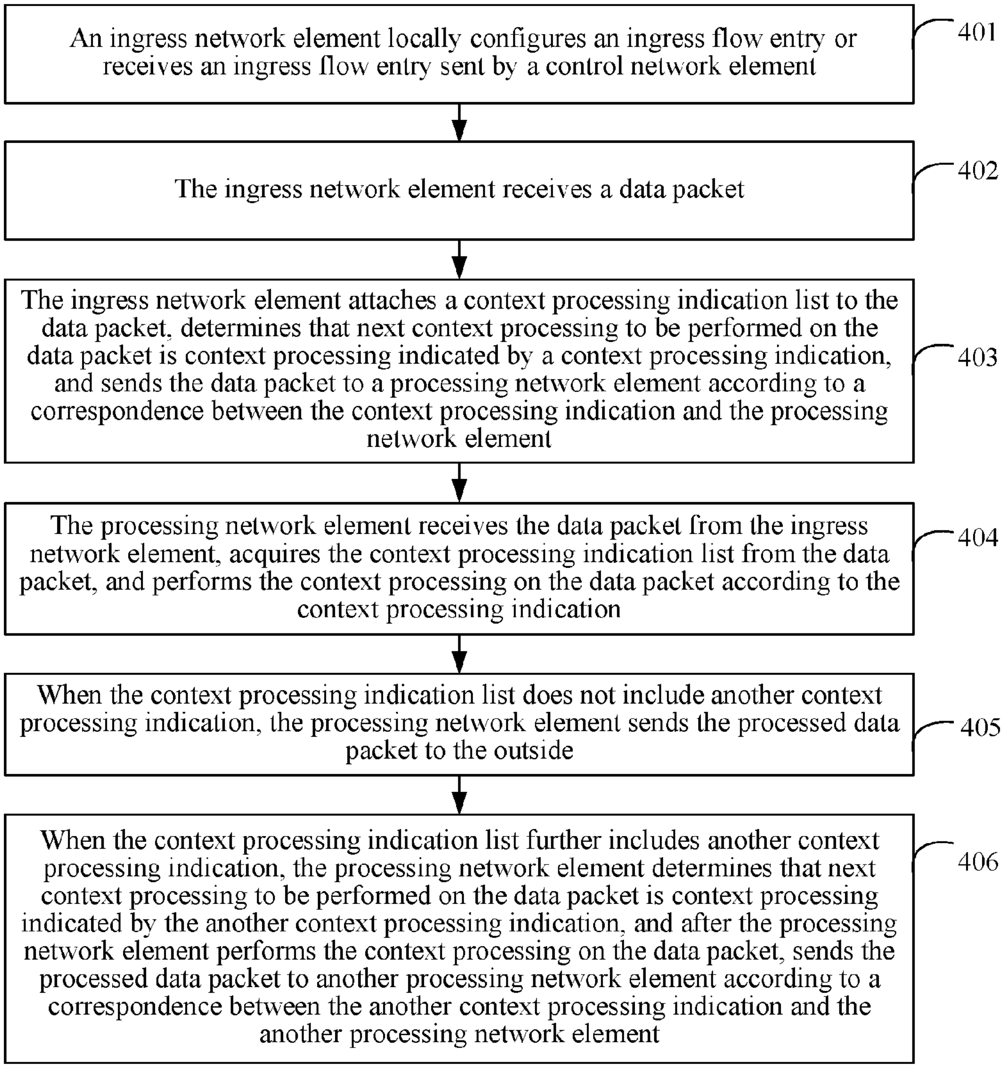
FIG. 5 is a schematic flowchart of a packet processing method according to still another embodiment of the present invention.

As shown in FIG. 5, an embodiment of the present invention provides a packet processing method, which is implemented by using the foregoing packet processing system and includes the following steps.

401: An ingress network element locally configures an ingress flow entry or receives an ingress flow entry sent by a control network element.

The control network element is configured to control forwarding or processing performed by the ingress network element and a processing network element on a data packet. The ingress flow entry includes flow description information and a processing network element indication. The flow description information matches the data packet. The processing network element indication is used to indicate the processing network element that processes the data packet after the ingress network element. For example, the flow description information may include one or a combination of packet characteristic fields such as a source MAC (Media Access Control) address, a destination MAC address, a source IP (Internet Protocol) address, a destination IP address, a source port number, a destination port number, an MPLS Label (multi-protocol label switching label), a ToS (type of service), an IPv6 flow label (Internet Protocol version 6 flow label), a GRE key (generic route encapsulation key), and a GTP TEID (general packet radio service tunneling protocol tunnel endpoint identifier), and is used to determine whether the packet belongs to a service flow to be processed this time. The processing network element indication includes a context processing indication list, where the context processing indication list includes a context processing indication.

402: The ingress network element receives the data packet.

By means of step 402, the ingress network element only has a function of receiving and sending the data packet, and the ingress network element and a processing network element are separately deployed in terms of function. Further, optionally, the ingress flow entry further includes an ingress context processing indication, where the ingress context processing indication is used to indicate context processing performed on the data packet. Step 402 further includes: performing, by the ingress network element, the context processing on the data packet according to the ingress context processing indication. In this case, the ingress network element has a capability of performing context processing on the packet, that is, in this case, the ingress network element and a processing network element are deployed together, and functions of the ingress network element include a function of a processing network element.

403: The ingress network element attaches the context processing indication list to the data packet, determines that next context processing to be performed on the data packet is context processing indicated by the context processing indication, and sends the data packet to the processing network element according to a correspondence between the context processing indication and the processing network element.

Optionally, the context processing indication list further includes addressing information of the processing network element, where the context processing indication corresponds to the addressing information of the processing network element.

In step 403, the sending the data packet to the processing network element according to a correspondence between the context processing indication and the processing network element is as follows: sending, by the ingress network element, the data packet to the processing network element according to the addressing information, which corresponds to the context processing indication, of the processing network element.

404: The processing network element receives the data packet from the ingress network element, acquires the context processing indication list from the data packet, and performs the context processing on the data packet according to the context processing indication.

405: When the context processing indication list does not include another context processing indication, the processing network element sends the processed data packet to the outside.

406: When the context processing indication list further includes another context processing indication, the processing network element determines that next context processing to be performed on the data packet is context processing indicated by the another context processing indication, and after the processing network element performs the context processing on the data packet, sends the processed data packet to another processing network element according to a correspondence between the another context processing indication and the another processing network element.

The another context processing indication is used to indicate the context processing performed on the data packet.

Optionally, the context processing indication list further includes addressing information of the another processing network element, where the another context processing indication corresponds to the addressing information of the another processing network element.

In step 406, the sending the processed data packet to another processing network element according to a correspondence between the another context processing indication and the another processing network element is as follows: sending, by the processing network element, the processed data packet to the another processing network element according to the addressing information, which corresponds to the another context processing indication, of the another processing network element.

According to the packet processing method provided in this embodiment of the present invention, a packet is forwarded to different network elements for context processing, so that context processing can be separately performed on the packet by using distributed forwarding-plane devices, so as to improve load balance during the context processing of the network packet.

Figure 6:
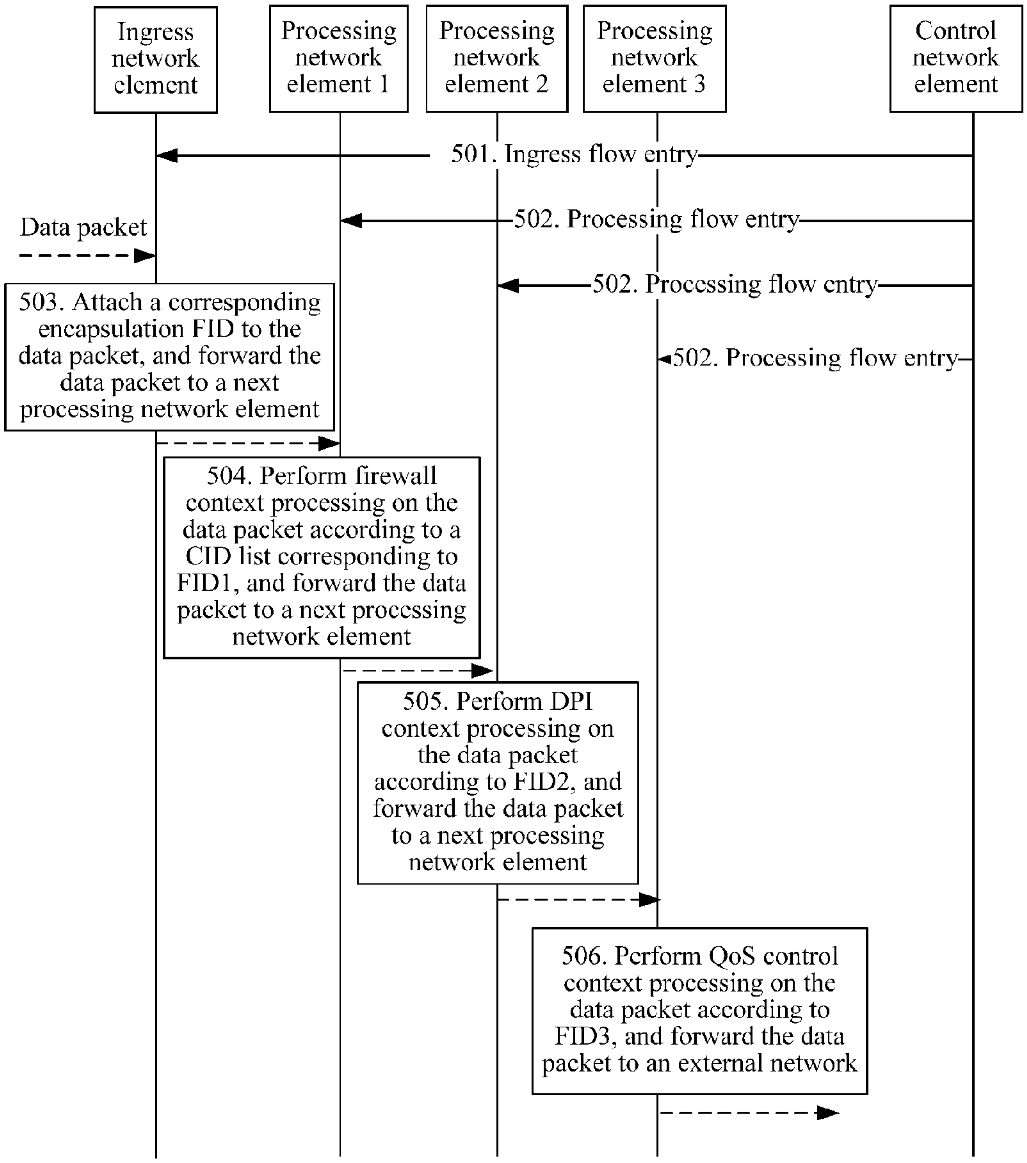
FIG. 6 is a schematic flowchart of a packet processing method according to yet another embodiment of the present invention.

An example in which an ingress network element and a processing network element are separately deployed (that is, the ingress network element does not have a capability of performing context processing on a packet) is used. As shown in FIG. 6, an example in which a packet passes through and is processed by an ingress network element and three processing network elements is used, where the ingress network element completes flow matching, and the three processing network elements respectively perform a virus firewall function, a DPI (deep packet inspection) parsing function, and a QoS (quality of service) control function on the packet, which includes the following steps.

501: A control network element delivers an ingress flow entry to a forwarding-plane ingress network element by using a flow entry installation message. The ingress flow entry includes flow description information, an encapsulation flow identifier FID1, and a processing network element indication. Forwarding information FWD info1 is used as an example of the processing network element indication. In this embodiment, a flow match rule is used an example of the flow description information for description. In step 501, an example in which the control network element sends the ingress flow entry is used; certainly, the ingress flow entry may also be locally configured.

The flow match rule may be one or a combination of packet characteristic fields such as a source MAC address, a destination MAC address, a source IP address, a destination IP address, a source port number, a destination port number, an MPLS label, a ToS, a IPv6 flow lable, a GRE key, and a GTP TEID, and is used to determine whether packets belongs to a same service flow to be processed this time. The forwarding information includes information used to determine a processing network element to which a packet is to be forwarded, such as an MAC address, an IP address, a domain name, or a self-defined identifier of the processing network element.

The following ingress flow entry is used as an example: <Flow entry>:={flow match rule, FID1, Fwd info1(IP=ip1) }.

502: The control network element delivers one or more processing flow entries to one or more forwarding-plane processing network elements by using one or more processing flow entry installation messages. In step 502, an example in which the control network element sends the processing flow entries is used. Certainly, the processing flow entries may also be locally configured.

The processing flow entries each include a match flow identifier and a context processing indication. When a processing network element needs to forward a data packet to another processing network element for context processing, a processing flow entry further includes an encapsulation flow identifier and forwarding information, where the forwarding information herein is a reprocessing network element indication.

For example, a processing flow entry sent to a processing network element 1 is as follows: <Flow entry>:={FID1, [CID 1], FID2, Fwd info2(IP=ip2)}. A processing flow entry sent to a processing network element 2 is as follows: <Flow entry>:={FID2, [CID 3], FID3, Fwd info3(IP=ip3)}. A processing flow entry sent to a processing network element 3 is as follows: <Flow entry>:={FID3, [CID 1, CID 4]}.

503: After a data packet arrives at the ingress network element, the ingress network element matches the data packet with flow match rules of ingress flow entries. According to an ingress flow entry that matches the data packet, the ingress network element attaches a corresponding encapsulation flow identifier to the data packet. The attachment may be implemented in various manners, for example, corresponding protocol encapsulation is performed on the packet by using the flow identifier as an MPLS label, a GRE Key, a GTP TEID, or the like, which is not limited in the present disclosure. In this embodiment, the MPLS label is used as an example, and the ingress network element performs MPLS encapsulation on the data packet, to add an MPLS packet header in which a label is FID1. The ingress network element sends, according to forwarding information, the encapsulated packet to the processing network element 1 whose IP address is ip1 for context processing.

The ingress flow entry may further include an encapsulation indication, and in step 503, the ingress network element attaches the encapsulation flow identifier to the data packet according to the ingress encapsulation indication.

504: The processing network element 1 searches, according to the encapsulation flow identifier (that is, the MPLS lable in this embodiment) of the data packet, for a processing flow entry that includes a same match flow identifier, and performs, according to content of the processing flow entry, local context processing corresponding to CID1 on the data packet on which MPLS decapsulation has been performed. For example, a context processing indication corresponding to CID1 is performing Trojan horse and virus filtering, and therefore, the processing network element 1 performs a Trojan horse and virus detection and filtering function on the packet. After completing the context processing corresponding to the local context processing indication, the processing network element performs MPLS encapsulation on the packet by using FID2 as an MPLS label, and sends, according to forwarding information, the encapsulated packet to the processing network element 2 whose IP address is ip2 for context processing. Certainly, the context processing indication may also include multiple types of context processing.

505: The processing network element 2 searches, according to the encapsulation flow identifier of the data packet, for a processing flow entry corresponding to FID2, and performs, according to content of the processing flow entry, local context processing corresponding to CID3 on the packet. For example, a context processing indication corresponding to CID3 is P2P deep packet parsing, and therefore, the processing network element 2 performs P2P service identification on the packet, and optionally attaches a P2P service identification result in a form of metadata to the packet. The processing network element 2 sends, according to forwarding information, the packet to the processing network element 3 whose IP address is ip3 for next context processing.

506: The processing network element 3 searches, according to an encapsulation flow identifier of the data packet, a processing flow entry corresponding to FID3, and performs, according to the processing flow entry corresponding to FID3, local context processing corresponding to CID1 and local context processing corresponding to CID4 on the packet on which MPLS decapsulation has been performed, for example, CID1 corresponds to control of a maximum bandwidth 2 Mbps, and CID4 corresponds to highest-priority forwarding. After completing the foregoing QoS control, because the processing flow entry does not carry forwarding information and an encapsulation flow identifier, the processing network element 3 directly forwards the processed packet to an external network according to a normal layer 2 or layer 3 rule.

It should be noted that in FIG. 6, after context processing is performed on the data packet by different processing network elements, specific content of the data packet may change. In this embodiment or another embodiment, there is no direct association relationship between the processing network elements, and the control network element performs control by using forwarding information, so that a same processing network element can appear multiple times in a processing process and can implement different context processing procedures for different packets each time, which is not limited in the present disclosure.

By means of the foregoing ingress network element and the context processing processes of the multiple processing network elements, the forwarding-plane network elements jointly complete various types of processing specified by the control network element on the service flow. Through the introduction of the flow identifier, the ingress network element only needs to perform packet matching on the packet once, and the following processing network elements can acquire information about the flow to which the packet belongs and metadata, so that the distributed processing network elements can share and process particular information.

Figure 7:
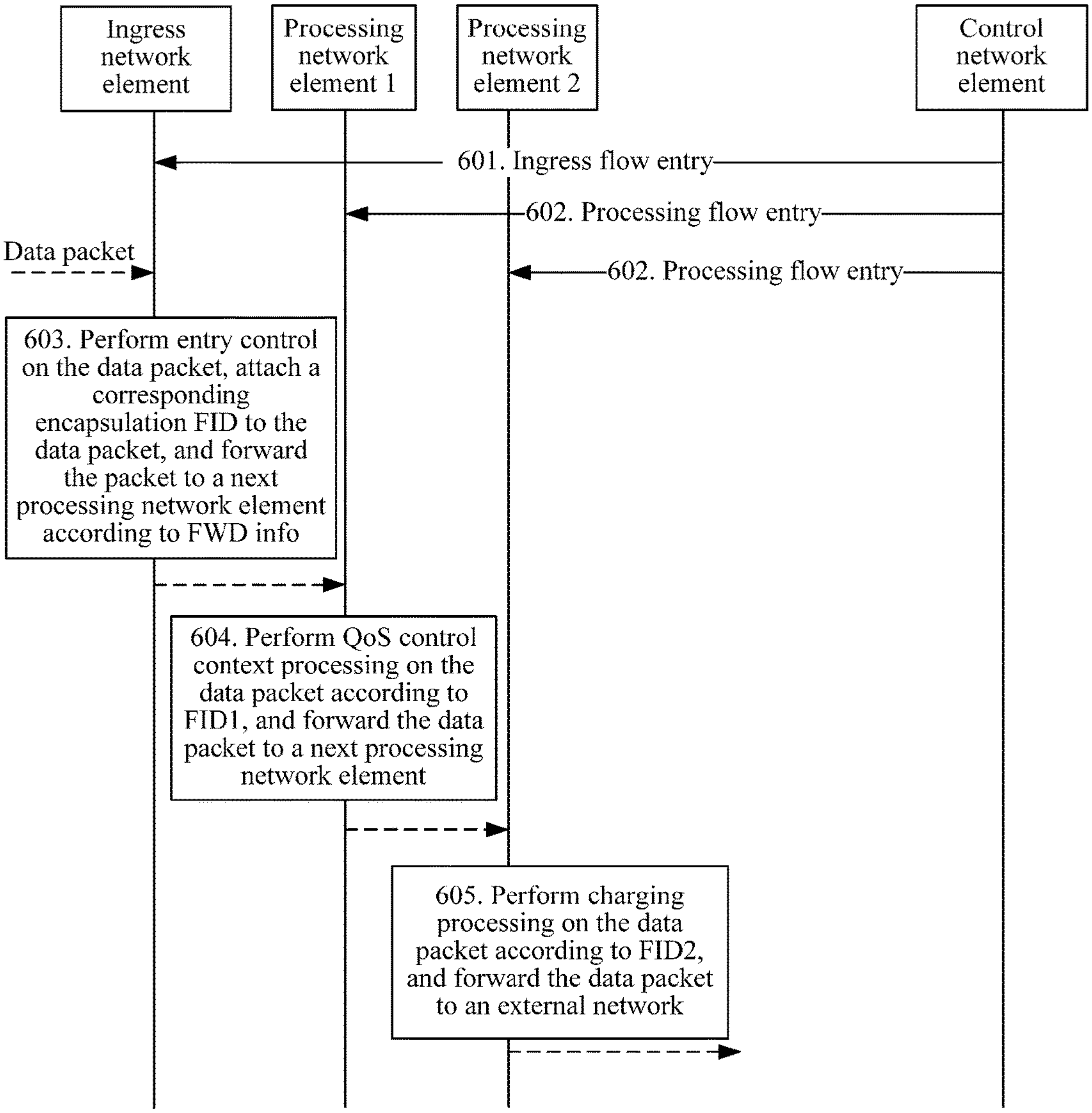
FIG. 7 is a schematic flowchart of a packet processing method according to another embodiment of the present invention.

Optionally, an example in which an ingress network element has a context processing function (that is, the ingress network element and a processing network element are deployed together) is used. As shown in FIG. 7, an example in which a packet passes through an ingress network element and two processing network elements is used, where the ingress network element completes flow matching and entry control, and the two processing network elements respectively perform a QoS control function and a charging function on the packet, which includes the following steps.

601: A control network element delivers an ingress flow entry to a forwarding-plane ingress network element by using an ingress flow entry installation message. In step 601, an example in which the control network element sends the ingress flow entry is used; certainly, the ingress flow entry may also be locally configured.

The ingress flow entry includes flow description information, an ingress context processing indication, an encapsulation flow identifier FID1, and a processing network element indication. Forwarding information FWD info1 is used as an example of the processing network element indication. In this embodiment, a flow match rule is used an example of the flow description information for description. In step 601, an example in which the control network element sends the ingress flow entry is used; certainly, the ingress flow entry may also be locally configured. The ingress context processing indication may be a local context processing list Local CID list 1 of the ingress network element, where the list includes multiple types of context processing.

As described in the previous embodiment, the flow match rule may be a combination of packet characteristic fields (such as an IP quintuple or a GTP TEID), and is used to determine whether a packet belongs to a service flow. The forwarding information includes information used to determine a next network element, such as an MAC address, an IP address, a domain name, or a self-defined identifier of the network element. In this embodiment, the following ingress flow entry is used as an example: <Flow entry>:={flow match rule, [CID 2], FID1, Fwd info1(ID=id1)}.

602: The control network element delivers, by using processing flow entry installation messages, processing flow entries to two forwarding-plane processing network elements configured to process the service flow. In step 602, an example in which the control network element sends the processing flow entries is used; certainly, the processing flow entries may also be locally configured.

The processing flow entries each include a match flow identifier and a context processing indication. When a processing network element needs to forward a data packet to another processing network element for context processing, a processing flow entry further includes an encapsulation flow identifier and forwarding information, where the forwarding information herein is a reprocessing network element indication. For example, a processing flow entry sent to a processing network element 1 is as follows: <Flow entry>:={FID1, [CID 1, CID 4], FID2, Fwd info2(ID=id2)}. A processing flow entry sent to a processing network element 2 is as follows: <Flow entry>:={FID2, [CID 2, CID 3], NO_FID}, where NO_FID is used as a processing encapsulation indication, used to indicate to the processing network element 2 that there is no need to continue to perform flow identifier encapsulation on a data packet. In this embodiment or another embodiment, the processing encapsulation indication may also be represented by using a particular FID value or in a manner of not carrying an FID field or in other manners, which is not limited in the present disclosure.

603: After a data packet arrives at the ingress network element, the ingress network element performs flow entry matching. Because in this embodiment, the ingress network element and a processing network element are deployed together, the ingress flow entry further includes a local context processing list, and the ingress network element needs to perform, according to the ingress flow entry matching the data packet, context processing corresponding to the local context list in the flow entry. For example, context processing corresponding to CID2 of the ingress network element is performing user IP entry control on the data packet, and therefore, the ingress network element determines, according to source and destination IP addresses of the data packet, whether to allow the packet to pass. For the data packet on which the context processing has been performed, the ingress network element attaches a corresponding encapsulation flow identifier to the data packet. In this embodiment, GTP protocol encapsulation is used as an example, and the ingress network element performs GTP encapsulation on the data packet, to add a GTP-U packet header in which a TEID (tunnel endpoint identifier) is FID1. The ingress network element sends, according to forwarding information, the encapsulated data packet to the processing network element 1 whose network element identifier is id1 for context processing. The ingress network element may optionally acquire, in a manner such as local configuration or a DNS (Domain Name System), a network element address corresponding to the network element identifier.

604: The processing network element 1 searches, according to the encapsulation flow identifier of the data packet, a processing flow entry corresponding to FID1, and performs, according to the processing flow entry corresponding to FID1, local context processing corresponding to CID1 and local context processing corresponding to CID4 on the data packet on which GTP decapsulation has been performed, for example, CID1 corresponds to control of a maximum bandwidth 2 Mbps, and CID4 corresponds to highest-priority forwarding. After completing the foregoing QoS control, the processing network element 1 performs GTP encapsulation on a user, to attach a GTP-U packet header in which a TEID is FID2. The processing network element 1 sends, according to forwarding information, the encapsulated data packet to the processing network element 2 whose network element identifier is id2 for context processing.

605: The processing network element 2 searches, according to the encapsulation flow identifier of the data packet, a processing flow entry corresponding to FID2, and performs, according to the processing flow entry corresponding to FID2, local context processing corresponding to CID2 and local context processing corresponding to CID3 on the data packet on which GTP decapsulation has been performed, for example, CID2 corresponds to online charging, and CID4 corresponds to offline bill generation. After completing the foregoing two types of context processing for charging, because the processing encapsulation indication in the flow entry is NO_FID, the processing network element 2 directly forwards the processed packet to an external network, and in this case, the processing flow entry does not include a reprocessing network element indication.

Figure 8:
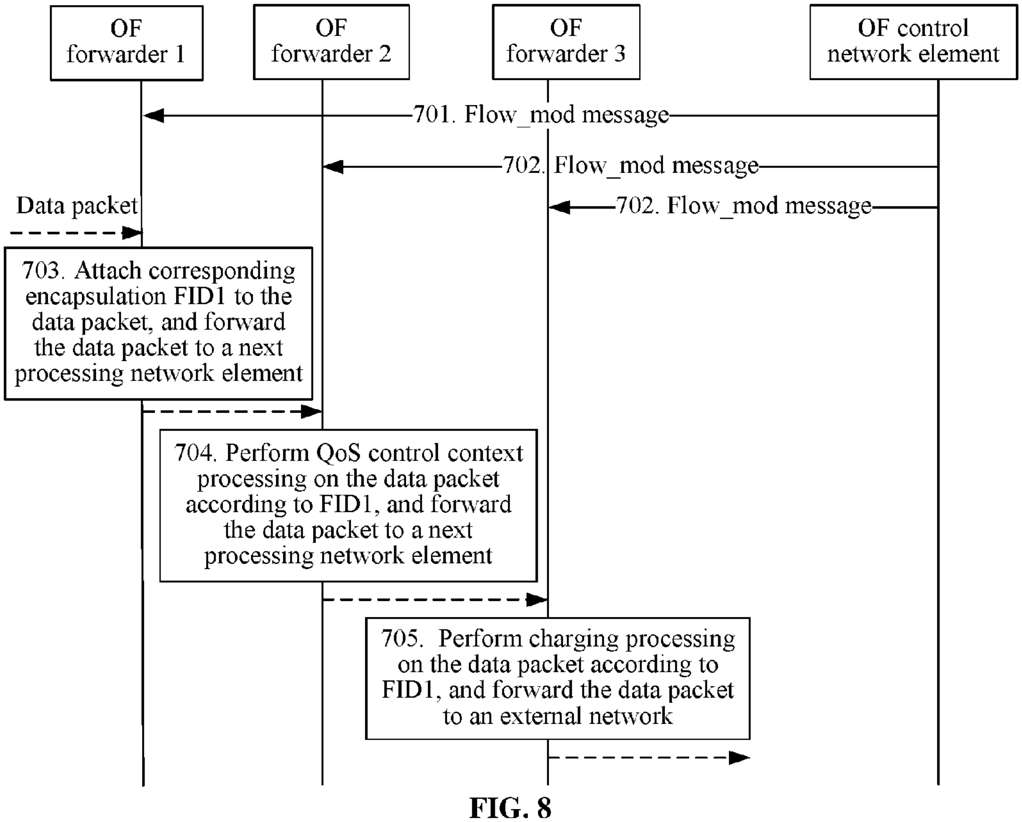
FIG. 8 is a schematic flowchart of a packet processing method according to still another embodiment of the present invention.

Optionally, an embodiment of the present invention further provides an implementation manner using the OpenFlow (OF for short) protocol. The OpenFlow protocol is extended, so that a control network element implements processing of ingress flow entries and processing flow entries on forwarders. In this case, under the OpenFlow protocol, the control network element in the previous embodiment is replaced with an OF control network element, and OF forwarders implement the functions of the foregoing ingress network element and processing network element. As shown in FIG. 8, a specific procedure is as follows.

701: An OF control network element delivers an ingress flow entry to an OF forwarder 1 by using a Flow_mod message. Same as the ingress flow entry, the Flow_mod message delivered to the OF forwarder 1 also includes flow description information, an encapsulation flow identifier FID1, and a processing network element indication. Forwarding information FWD info1 is used as an example of the processing network element indication. In this embodiment, a flow match rule is used an example of the flow description information for description. Referring to the previous embodiment, in this embodiment, because a forwarder is used to implement a function of a processing network element or an ingress network element, the corresponding processing network element indication in this embodiment is used to indicate an OF forwarder that processes a data packet after the OF forwarder 1. In step 701, an example in which the OF control network element sends the ingress flow entry is used; certainly, the ingress flow entry may also be locally configured.

As described in the previous embodiment, the flow match rule may be a combination of packet characteristic fields (such as an IP quintuple or a GTP TEID), and is used to determine whether a packet belongs to the service flow. The encapsulation flow identifier FID1 is provided as a parameter of a Push_Tag action, and the forwarding information is provided as a parameter of an Output action. In this embodiment, the following flow entry is used as an example: <Flow_mod>:={ofp_match(n-Tuple),ofp_instructions [push_tag(FID1), Output(2)]}.

702: The OF control network element delivers, by using Flow_mod messages, processing flow entries to two OF forwarders configured to process the service flow. In step 702, an example in which the OF control network element sends the processing flow entries is used. Certainly, the processing flow entries may also be locally configured.

Same as a processing flow entry, a Flow_mod message delivered to another OF forwarder other than the OF forwarder 1 also includes a match flow identifier and a context processing indication. When the another OF forwarder needs to forward the data packet to still another OF forwarder for context processing, the Flow_mod message further includes an encapsulation flow identifier and forwarding information, where the forwarding information herein is a reprocessing network element indication.

For example, a flow entry sent to an OF forwarder 2 is as follows: <Flow_mod>:={ofp_match(FID1), and ofp_instructions[Context[CID1], Output(1)]}. A flow entry sent to an OF forwarder 3 is as follows: <Flow_mod>:={ofp_match (FID1), and ofp_instructions[Context[CID1,CID2], Pop_Tag( ), Output(2)]}, where Context indicates performing an action of corresponding context processing.

Push_Tag/Pop_Tag respectively indicates performing encapsulation and decapsulation on a packet. In this embodiment, an MPLS label is used as an example, that is, a Push_Tag action is encapsulating an FID as an MPLS label into a packet, and a Pop_Tag action is removing the MPLS label from the packet. Similarly, FID encapsulation may also be performed in a form of GRE, GTP, or another protocol, which is not limited in the present disclosure.

An Output action is sending a packet through a corresponding port. In this embodiment or another embodiment, the encapsulation indication may also be represented by using a particular FID value or in a manner of not carrying an FID field or in other manners, which is not limited in the present disclosure.

703: After a data packet arrives at the OF forwarder 1, the OF forwarder 1 performs flow entry matching, and adds a corresponding encapsulation flow identifier to the data packet by performing a Push_Tag(FID1) operation. In this embodiment, MPLS protocol encapsulation is used as an example, and the OF forwarder 1 adds an MPLS header in which an MPLS label is FID1 to the packet, and sends, according to forwarding information (the parameter of the Output action), the data packet to the OF forwarder 2 through a port 2 for context processing.

704: The OF forwarder 2 performs flow entry matching according to an MPLS field in the data packet, and performs local context processing corresponding to CID1 on the data packet according to a processing flow entry corresponding to FID1, for example, CID1 corresponds to an IPv4 packet reassembling context operation. The OF forwarder 2 sends the data packet on which IPv4 packet reassembling has been performed to the OF forwarder 3 through a port 1 of the OF forwarder 2 for context processing.

705: The OF forwarder 3 performs flow table matching on the data packet according to in the MPLS label in the data packet, and performs local context processing corresponding to CID1 and local context processing corresponding to CID2 on the data packet according to the processing flow entry corresponding to FID1, for example, CID1 corresponds to a maximum bandwidth (2 Mbps) restriction context operation, and CID2 corresponds to an offline charging context operation. After completing the foregoing maximum bandwidth restriction operation and offline charging operation, the OF forwarder 3 removes the FID information (that is, the MPLS label in this embodiment) included in the data packet according to the Pop_Tag action, and forwards the data packet to an external network through a port 2 of the OF forwarder 3 according to the Output action.

In this embodiment, by delivering different flow rules, the OF forwarder 1 may also perform a part of context processing before forwarding the packet to another processing network element, for example, in step 701, the following flow rule is delivered: <Flow_mod>:={ofp_match(n-Tuple), ofp_instructions[Context(CID 1),push_tag(FID1), Output (2)]}. In this case, after completing the context processing corresponding to CID1, the OF forwarder 1 performs flow identifier encapsulation and forwarding on the processed packet.

Figure 9:
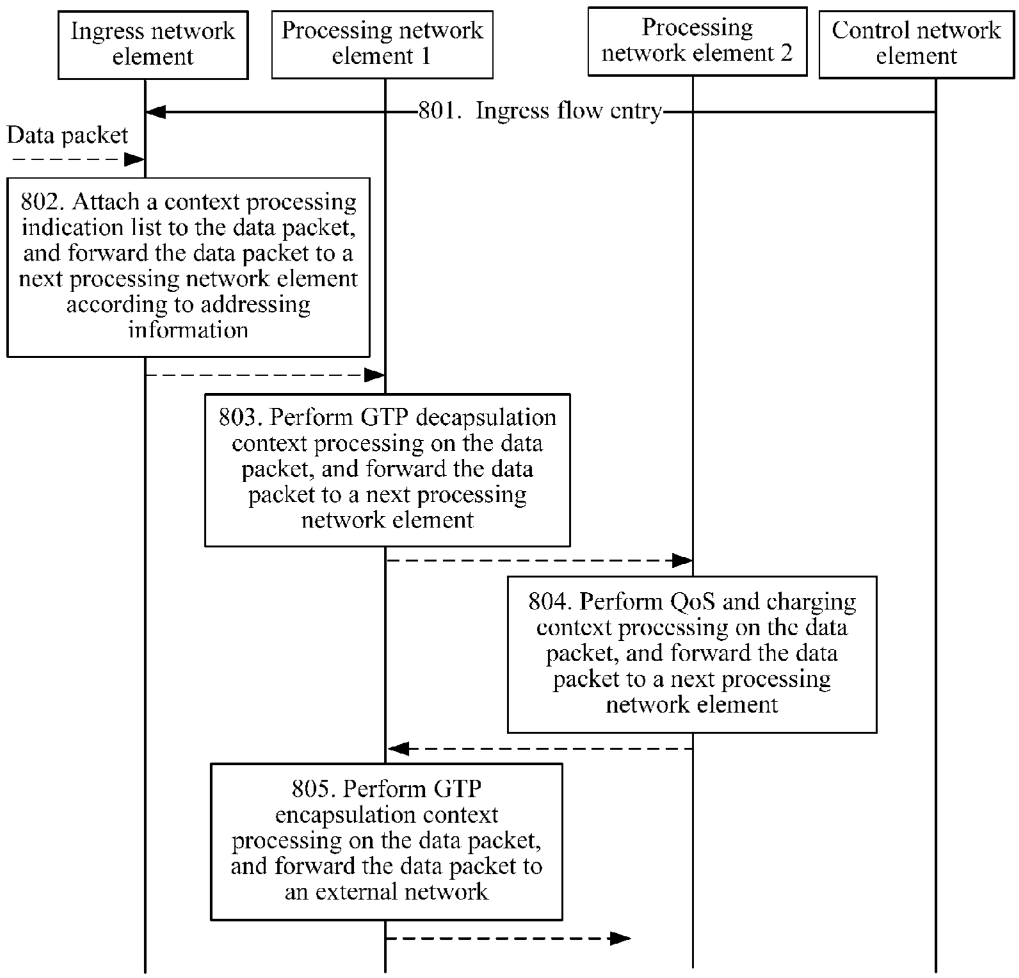
FIG. 9 is a schematic flowchart of a packet processing method according to yet another embodiment of the present invention.

Optionally, an example in which an ingress network element and a processing network element are separately deployed is used. As shown in FIG. 9, an example in which a packet passes through an ingress network element and two processing network elements is used, where the ingress network element completes flow matching, and the two processing network elements respectively perform a QoS/charging control function and a GTP encapsulation/decapsulation function on the packet. Each network element determines a next processing network element according to addressing information that is of the processing network element and that is carried in a context list, which includes the following steps:

801: A control network element delivers an ingress flow entry to a forwarding-plane ingress network element by using an ingress flow entry installation message.

In step 801, an example in which the control network element sends the ingress flow entry is used; certainly, the ingress flow entry may also be locally configured. The ingress flow entry includes flow description information and a processing network element indication. The processing network element indication includes a context processing indication list CID list, and the context processing indication list includes a context processing indication and addressing information of a processing network element.

A flow match rule is used as an example of the flow description information, and is used to determine whether a packet belongs to the service flow. Refer to the descriptions of the foregoing embodiments, and details are not described repeatedly herein. The context processing indication list CID list includes all context processing indications of all types of context processing that needs to be performed by a forwarding plane on the packet and addressing information (such as an IP address, an identifier, or a domain name) of a processing network element corresponding to each context processing indication. The following flow entry is used as an example: <Flow entry>:={flow match rule, [NID1,CID1], [NID2, (CID3, CID4)],[NID3, CID5]}.

In this embodiment, the following specific context processing is used as an example: CID1 corresponds to GTP decapsulation, CID3 corresponds to 2 Mbps bandwidth control, CID4 corresponds to offline charging, and CID5 corresponds to GTP encapsulation (src_ip=ip1, dst_ip=ip2, TEID=0x0004).

In this embodiment, each forwarding-plane network element determines a next network element according to an NID in the context processing indication list CID list. In this embodiment, an IP address is used as the NID, or another type of identifier such as a domain name or a self-defined identifier may be used, which is not limited in the present disclosure.

802: After a data packet arrives at the ingress network element, the ingress network element performs flow entry matching. The ingress network element adds a corresponding context processing indication list in a flow entry matching the data packet to the packet, and sends, according to a sequence in a forwarding network element list, the packet to a processing network element corresponding to NID1. A specific packet encapsulation format may be a form of a self-defined information element, which is not limited in the present disclosure. A possible packet format is as follows: <interim_packet>:={[NID1,CID1],[NID2,(CID3,CID4)], [NID3, CID5], [user packet]}.

803: The processing network element 1 performs a context processing indication that can be processed by the processing network element 1 on the packet according to the foregoing context processing indication list in the data packet and according to a sequence in the list, until context processing corresponding to a next context processing indication in the context processing indication list does not belong to processing performed by the processing network element 1.

In this embodiment, the processing network element 1 performs a GTP decapsulation operation on the packet according to a context processing indication corresponding to CID1. Because context processing corresponding to a next context processing indication CID3 in the list does not belong to the ingress network element, the ingress network element sends a remaining context processing indication list and the data packet on which decapsulation processing has been performed to a processing network element corresponding to a processing network element identifier NID2 corresponding to next context processing. A possible packet format is as follows: <interim_packet>:={[NID2, (CID3, CID4)],[NID3, CID5], [user packet]}.

804: The processing network element 2 sequentially performs different types of context processing on the packet according to the context processing list carried in the data packet, until a context corresponding to a next context processing indication in the list does not belong to the processing network element 2.

In this embodiment, the processing network element 2 performs control of a maximum bandwidth 2 Mbps on the packet according to context processing corresponding to CID3, and performs, according to context processing corresponding to CID4, offline charging on the data packet controlled by means of the bandwidth. Because context processing corresponding to a next context processing indication CID5 in the context processing indication list does not belong to the processing network element 2, the processing network element 2 sends a remaining context processing indication list and the data packet on which offline charging has been performed to a processing network element corresponding to a processing network element identifier NID1 corresponding to next context processing. A specific packet encapsulation format may be a form of a self-defined information element, which is not limited in the present disclosure. A possible packet format is as follows: <interim_packet>:={[NID1,CID5], [user packet]}.

805: The processing network element 1 performs GTP encapsulation context processing corresponding to CID5 on the data packet user packet according to the context processing indication list carried in the foregoing message, that is, encapsulates a GTP-U packet header specified in the context processing indication into the packet. After completing the foregoing encapsulation context processing, because all types of context processing in the context processing indication list is completed, the processing network element 2 directly forwards the processed packet to an external network.

By means of the foregoing ingress network element and processing by the multiple processing network elements, a series of context processing, which is specified by the control network element, of the packet is completed, and the packet is finally sent to the external network.

It should be noted that in FIG. 9, a user packet is uniformly used to refer to a to-be-processed packet, a CID list is used to present a context processing indication, and an NE list is used to represent a processing network element list. However, after context processing is performed by different processing network elements, as described in the steps, specific content of the user packet, the CID list, and the NE list may change.

Figure 10:
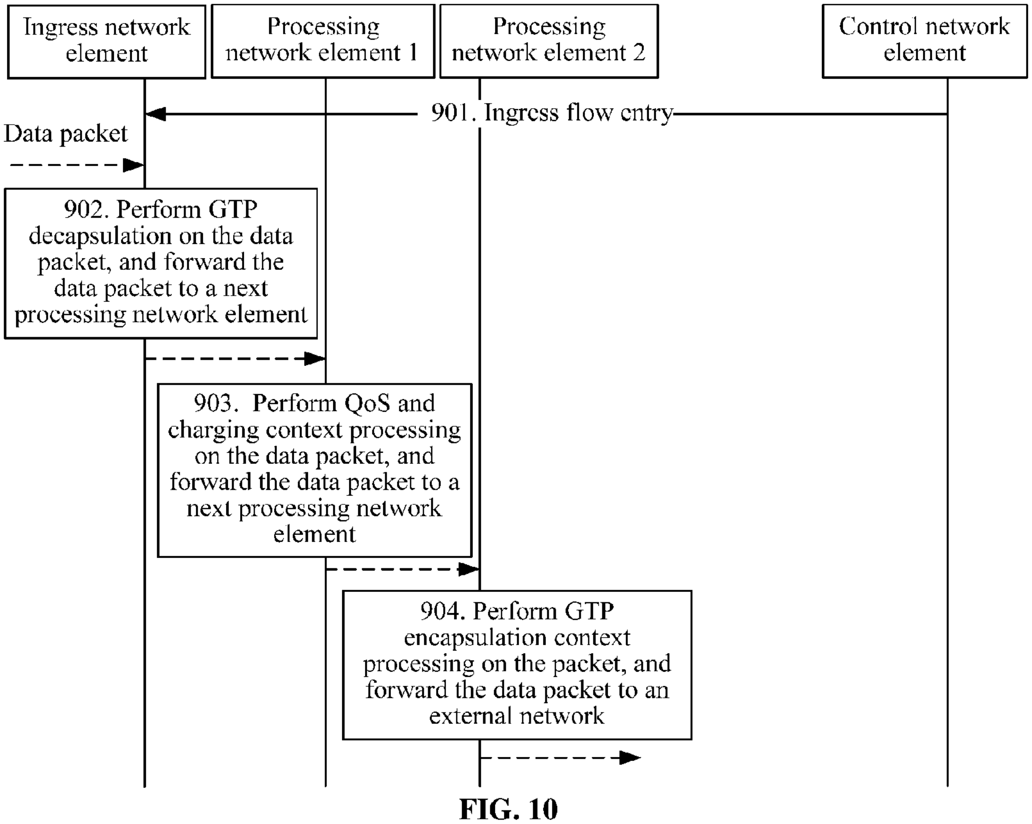
FIG. 10 is a schematic flowchart of a packet processing method according to another embodiment of the present invention.

Optionally, an example in which an ingress network element has a context processing function (that is, the ingress network element and a processing network element are deployed together) is used. As shown in FIG. 10, an example in which a packet passes through an ingress network element and two processing network elements is used, where the ingress network element completes flow matching and GTP decapsulation, and the two processing network elements respectively perform a QoS/charging control function and a GTP encapsulation function on the packet. Each network element determines a next processing network element according to a CID list, which includes the following steps.

901: A control network element delivers an ingress flow entry to a forwarding-plane ingress network element by using an ingress flow entry installation message.

In step 901, an example in which the control network element sends the ingress flow entry is used. Certainly, the ingress flow entry may also be locally configured. The ingress flow entry includes flow description information and a processing network element indication. The processing network element indication includes a context processing indication list CID list, and the context processing indication list includes a context processing indication and addressing information of a processing network element.

A flow match rule is used as an example of the flow description information. Refer to the descriptions of the foregoing embodiments, and details are not described repeatedly herein. The following flow entry is used as an example: <Flow entry>:={flow match rule, [CID1, CID3, CID4, CID5]}.

In this embodiment, the following specific context processing is used as an example: CID1 corresponds to GTP decapsulation, CID3 corresponds to 2 Mbps bandwidth control, CID4 corresponds to offline charging, and CID5 corresponds to GTP encapsulation (src_ip=ip1, dst_ip=ip2, TEID=0x0002).

In this embodiment, each forwarding-plane network element determines a next network element according to a CID, and therefore, the CID is addressing information of a processing network element. Several possible implementation manners include: a part of a CID field is identifier information (such as an IP address, a domain name, or a name identifier) of a processing network element; or each forwarding network element may map a CID to corresponding network element identifier information according to locally configured information or a computation rule; or each forwarding network element forwards a data packet to a corresponding processing network element by using a relay network element that can map a CID to a network element identifier, or other manners, which is not limited in the present disclosure.

902: After a data packet arrives at the ingress network element, the ingress network element performs flow entry matching. In this embodiment, the ingress network element and a processing network element are deployed together. Therefore, the ingress flow entry further includes an ingress context processing indication, and the ingress context processing indication may be included in the context processing indication list. In this case, the ingress network element executes locally executable context processing according to a sequence in the context processing indication list, until context processing corresponding to a next context processing indication in the context processing indication list does not belong to the ingress network element.

In this embodiment, the ingress network element performs a GTP decapsulation operation on the packet according to context processing corresponding to CID1. Because context processing corresponding to a next context processing indication CID3 in the list does not belong to the ingress network element, the ingress network element attaches a remaining context processing indication list to the decapsulated data packet, and sends the data packet to a processing network element 1 corresponding to CID2. A specific packet encapsulation format may be a form of a self-defined information element, which is not limited in the present disclosure. A possible packet format is as follows: <interim_packet>:={[CID3, CID4, CID5], [user packet]}.

903: The processing network element 1 sequentially performs context processing according to the sequence in the context processing indication list carried in the data packet, until context processing corresponding to a next context processing indication in the context processing indication list does not belong to the processing network element 1.

In this embodiment, the processing network element 1 performs control of a maximum bandwidth 2 Mbps on the packet according to context processing corresponding to CID3, and performs, according to a context corresponding to CID4, offline charging on the packet controlled by means of the bandwidth. Because context processing corresponding to a next context processing indication CID5 in the context processing indication list does not belong to the processing network element 1, the processing network element 1 continues to forward the data packet including a remaining context processing indication list to a processing network element corresponding to CID5. A specific packet encapsulation format may be a form of a self-defined information element, which is not limited in the present disclosure. A possible packet format is as follows: <interim_packet>:={[CID5], [user packet]}.

904: The processing network element 2 performs, according to the context processing indication list carried in the foregoing message, GTP encapsulation context processing corresponding to CID5, to encapsulate a GTP-U packet header specified in the context processing into the data packet. After completing the foregoing encapsulation context processing, because all contexts in the context list are performed, the processing network element 2 directly forwards the processed packet to an external network.

By means of the foregoing ingress network element and processing by the multiple processing network elements, a series of context processing, which is specified by the control network element, of the data packet is completed, and the packet is finally sent to the external network. In this embodiment, each network element determines a next address according to a CID, and therefore, a packet may repeatedly pass through a processing network element according to different CID lists, which is not limited in the present disclosure.

Figure 11:
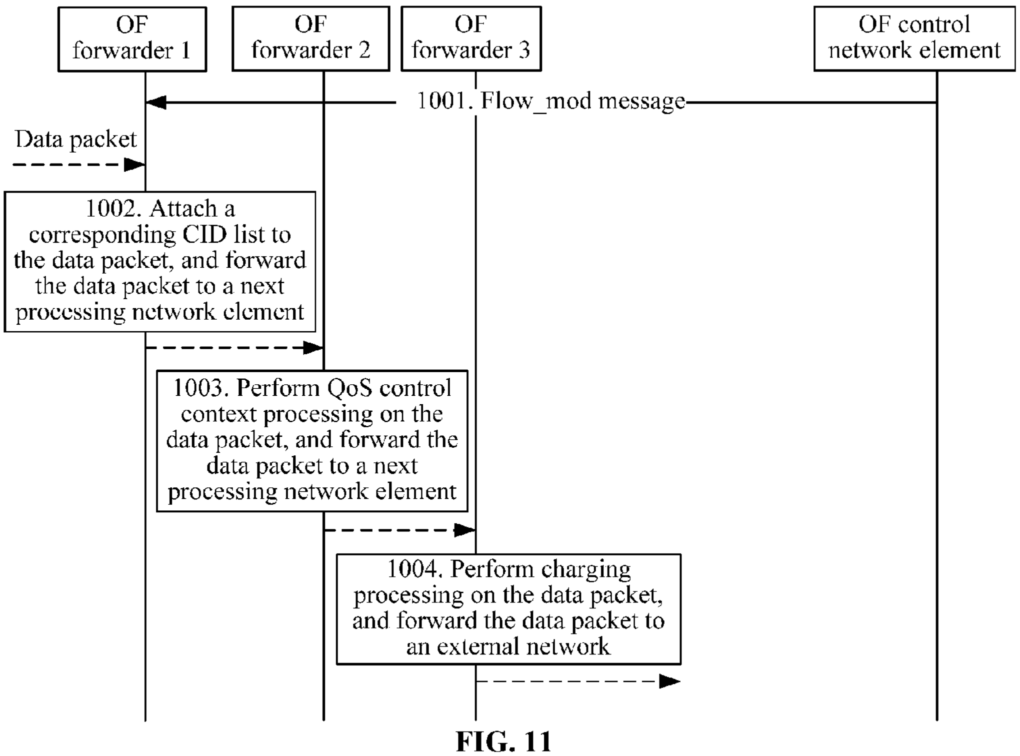
FIG. 11 is a schematic flowchart of a packet processing method according to still another embodiment of the present invention.

Optionally, an embodiment of the present invention further provides an implementation manner using the OpenFlow (OF for short) protocol. The OpenFlow protocol is extended, so that a control network element implements processing of ingress flow entries and processing flow entries on forwarders. In this case, under the OpenFlow protocol, the control network element in the previous embodiment is replaced with an OF control network element, and OF forwarders implement the functions of the foregoing ingress network element and processing network element. Referring to FIG. 11, a specific procedure is as follows.

1001: An OF control network element delivers an ingress flow entry to an OF forwarder 1 by using a Flow_mod message. The flow entry includes flow description information, that is, a flow match rule, and a context identifier list. The context identifier list optionally further includes identifiers of forwarders that perform contexts.

Same as the ingress flow entry, the Flow_mod message delivered to the OF forwarder 1 also includes flow description information and a processing network element indication. The processing network element indication includes a context processing indication list, that is, a CID list. The context processing indication list includes context processing indications and addressing information of OF forwarders. The corresponding processing network element indication in this embodiment is used to indicate a next OF forwarder that processes the data packet after the OF forwarder 1. In step 1001, an example in which the OF control network element sends the ingress flow entry is used; certainly, the ingress flow entry may also be locally configured.

In this embodiment, a flow match rule is used as an example of the flow description information for description, and is used to determine whether a packet belongs to the service flow. The context processing indication list is provided as a parameter of a Push_CID action. In this embodiment, the following flow entry is used as an example: <Flow_mod>:={ofp_match(n-Tuple),ofp_instructions [push_cid([NID1,CID1],[NID2,CID1,CID3]), Output(2)]}.

In this embodiment, a number of a port at which a network element is located is used as an NID, and an IP address, a MAC address, a domain name, or the like may also be used as an NID, or a forwarder obtains, through mapping, addressing information according to a part or all of a CID, which is not limited in the present disclosure.

1002: After a data packet arrives at the OF forwarder 1, the OF forwarder 1 performs flow entry matching, and attaches a corresponding context processing indication list of the packet to the packet by performing a push_cid ([NID1, CID1], [NID2, CID1, CID3]) operation. The attachment may be implemented by using a self-defined information element, which is not limited in the present disclosure. The OF forwarder 1 sends, according to addressing information (a parameter of an Output action) or an identifier NID of an OF forwarder corresponding to the first context processing indication, the data packet to an OF forwarder 2 through a corresponding port for context processing.

1003: The OF forwarder 2 executes locally executable context processing on the data packet according to the context processing indication list carried in the packet. In this embodiment, for example, CID1 corresponds to DPI parsing, and therefore, the OF forwarder 2 performs DPI parsing on the data packet, and optionally attaches a parsing result in a form of metadata to the packet. The OF forwarder 2 deletes the context processing indication that has already been executed from the context processing indication list carried in the data packet, and sends, according to addressing information in a subsequent context processing indication, the packet to an OF forwarder 3 corresponding to NID2 for context processing.

Herein, when the context processing indication list does not include a single forwarder identifier, the OF forwarder 2 may obtain, through mapping, addressing information of a next processor according to a subsequent CID identifier, which is not limited in the present disclosure.

1004: The OF forwarder 3 performs context processing corresponding to CID1 and context processing corresponding to CID3 on the packet according to the context processing indication list carried in the packet, for example, CID1 corresponds to a maximum bandwidth (2 Mbps) restriction context operation, and CID3 corresponds to forwarding (port 1) context processing. The OF forwarder 3 deletes the foregoing context processing indication from the context processing indication list carried in the data packet, and completes the foregoing maximum bandwidth restriction and forwarding operations, to forward the processed data packet to an external network.

In this embodiment, by delivering different flow rules, the OF forwarder 1 may perform a part of context processing before forwarding the data packet to another OF forwarder. For example, in step 1001, the following Flow_mod message is delivered:

```
<Flow_mod>:={ofp_match(n-Tuple),ofp_instructions[Context(CID1),
push_cid([NID1,CID1],[NID2,CID1,CID3]), Output(2)]}.
```

Therefore, after completing context processing corresponding to CID0 on the received data packet, the OF forwarder 1 attaches the CID list to the processed data packet and forwards the data packet.

In the foregoing OF-based solution, ofp_instruction is used to indicate an action performed by a forwarder, such as context processing, flow identifier encapsulation or decapsulation, or forwarding. The foregoing processing may also be implemented by using an action list of OpenFlow or a logic port/virtual port mechanism, and details are not described in this disclosure.

According to the packet processing method provided in this embodiment of the present invention, a packet is forwarded to different network elements for context processing, so that context processing can be performed on the packet by using distributed forwarding plane devices, so as to improve load balance during the context processing of the network packet.

Figure 12:
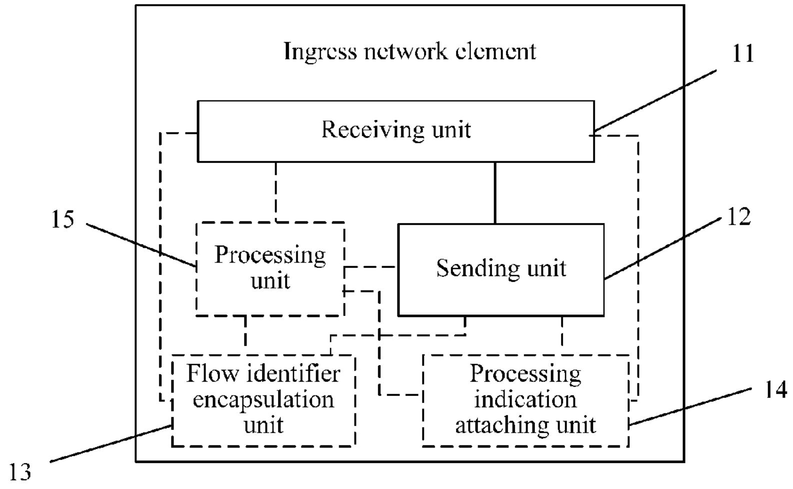
FIG. 12 is a schematic structural diagram of an ingress network element according to an embodiment of the present invention.

As shown in FIG. 12, an embodiment of the present invention provides an ingress network element, configured to implement the foregoing packet processing method. The ingress network element includes the following.

A receiving unit 11, configured to receive a data packet.

A sending unit 12, configured to send the data packet received by the receiving unit 11 to a processing network element according to an ingress flow entry, so that the processing network element performs context processing on the data packet.

The ingress flow entry includes flow description information and a processing network element indication, the flow description information matches the data packet, and the processing network element indication is used to indicate the processing network element that processes the data packet after the ingress network element.

Optionally, the ingress flow entry further includes an encapsulation flow identifier, where the encapsulation flow identifier is used to identify a service flow to which the data packet belongs. The ingress network element further includes a flow identifier encapsulation unit 13, configured to attach the encapsulation flow identifier to the data packet, so that the processing network element acquires the encapsulation flow identifier from the data packet, acquires a processing flow entry according to the encapsulation flow identifier, and performs the context processing on the data packet according to the processing flow entry.

Optionally, the ingress flow entry further includes an ingress encapsulation indication, where the ingress encapsulation indication is used to indicate attaching the encapsulation flow identifier to the data packet. The flow identifier encapsulation unit 13 is configured to attach the encapsulation flow identifier to the data packet according to the ingress encapsulation indication.

Optionally, the ingress flow entry is locally configured or sent by a control network element, where the control network element is configured to control forwarding or processing performed by the ingress network element on the data packet.

Optionally, the processing network element indication includes a context processing indication list, where the context processing indication list includes the context processing indication. The ingress network element further includes a processing indication attaching unit 14, configured to attach the context processing indication list to the data packet. The sending unit 12 is configured to determine that next context processing to be performed on the data packet is the context processing indicated by the context processing indication, and send the data packet to the processing network element according to a correspondence between the context processing indication and the processing network element.

Optionally, the context processing indication list further includes addressing information of the processing network element, where the context processing indication corresponds to the addressing information of the processing network element. The sending unit 12 is configured to send the data packet to the processing network element according to the addressing information, which corresponds to the context processing indication, of the processing network element.

Optionally, the ingress flow entry is locally configured or sent by a control network element, where the control network element is configured to control forwarding performed by the ingress network element on the data packet.

Further, optionally, the ingress flow entry further includes an ingress context processing indication, where the ingress context processing indication is used to indicate context processing performed on the data packet; the ingress network element further includes a processing unit 15. The processing unit 15 is configured to perform the context processing on the data packet according to the ingress context processing indication.

According to the ingress network element provided in this embodiment of the present invention, a packet is forwarded to different network elements for context processing, so that context processing can be performed on the packet by using distributed forwarding-plane devices, so as to improve load balance during the context processing of the network packet.

Figure 13:
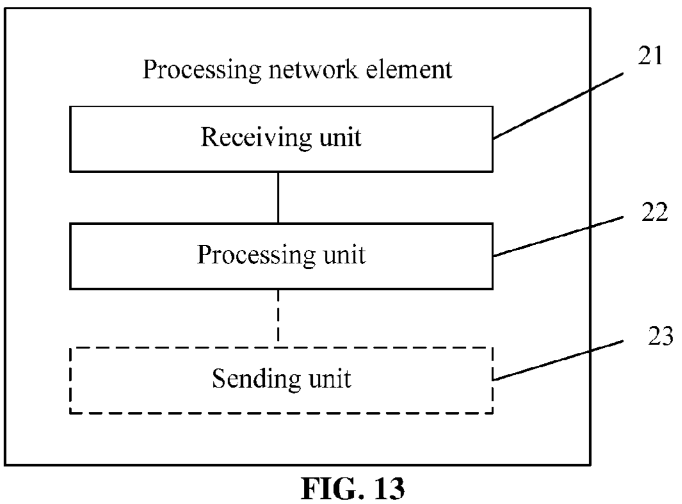
FIG. 13 is a schematic structural diagram of a processing network element according to an embodiment of the present invention.

As shown in FIG. 13, an embodiment of the present invention provides a processing network element, configured to implement the foregoing packet processing method. The processing network element includes the following.

A receiving unit 21, configured to receive a data packet.

A processing unit 22, configured to perform, according to a context processing indication, context processing on the data packet received by the receiving unit 21.

The context processing indication is used to indicate the context processing performed on the data packet.

Optionally, the processing unit 22 is configured to acquire an encapsulation flow identifier from the data packet, acquire a processing flow entry according to the encapsulation flow identifier, and perform the context processing on the data packet according to the processing flow entry. The encapsulation flow identifier is used to identify a service flow to which the data packet belongs, the processing flow entry includes a match flow identifier and the context processing indication, and the match flow identifier matches the encapsulation flow identifier.

Optionally, when the processed data packet does not include the encapsulation flow identifier, the processing unit 22 is further configured to attach a flow identifier to the processed data packet, where the flow identifier is the encapsulation flow identifier, or when the processing flow entry further includes a new encapsulation flow identifier, the flow identifier is the new encapsulation flow identifier.

Optionally, the processing flow entry further includes a processing encapsulation indication; the processing encapsulation indication is used to indicate attaching the flow identifier to the processed data packet. The processing unit 22 is configured to attach the flow identifier to the processed data packet according to the processing encapsulation indication.

Optionally, the processing network element further includes a sending unit 23. When the processing flow entry does not include a reprocessing network element indication, the sending unit 23 sends the data packet processed by the processing unit 22 to the outside; or when the processing flow entry further includes a reprocessing network element indication, the sending unit 23 sends the data packet processed by the processing unit 22 to a next processing network element according to the reprocessing network element indication, where the reprocessing network element indication is used to indicate the next processing network element that processes the data packet after the processing network element.

Optionally, the processing flow entry is locally configured or sent by a control network element, where the control network element is configured to control forwarding or processing performed by the processing network element on the data packet.

Optionally, the processing unit 22 is configured to acquire a context processing indication list from the data packet, where the context processing indication list includes the context processing indication, and perform the context processing on the data packet according to the context processing indication.

Optionally, the processing network element further includes a sending unit 23. When the context processing indication list does not include another context processing indication, the sending unit 23 sends the data packet processed by the processing unit 22 to the outside; or when the context processing indication list further includes another context processing indication, the sending unit 23 determines that next context processing to be performed on the data packet is context processing indicated by the another context processing indication, and after the processing unit 22 performs the context processing on the data packet, sends the data packet processed by the processing unit 22 to another processing network element according to a correspondence between the another context processing indication and the another processing network element, where the another context processing indication is used to indicate the context processing performed on the data packet.

Optionally, the context processing indication list further includes addressing information of the another processing network element, where the another context processing indication corresponds to the addressing information of the another processing network element. The sending unit 23 is configured to send the data packet processed by the processing unit to the another processing network element according to the addressing information, which corresponds to the another context processing indication, of the another processing network element.

According to the processing network element provided in this embodiment of the present invention, a data packet is forwarded by an ingress network element to different network elements for context processing, so that context processing can be performed on the packet by using distributed forwarding-plane devices, so as to improve load balance during the context processing of the network packet.

Figure 14:
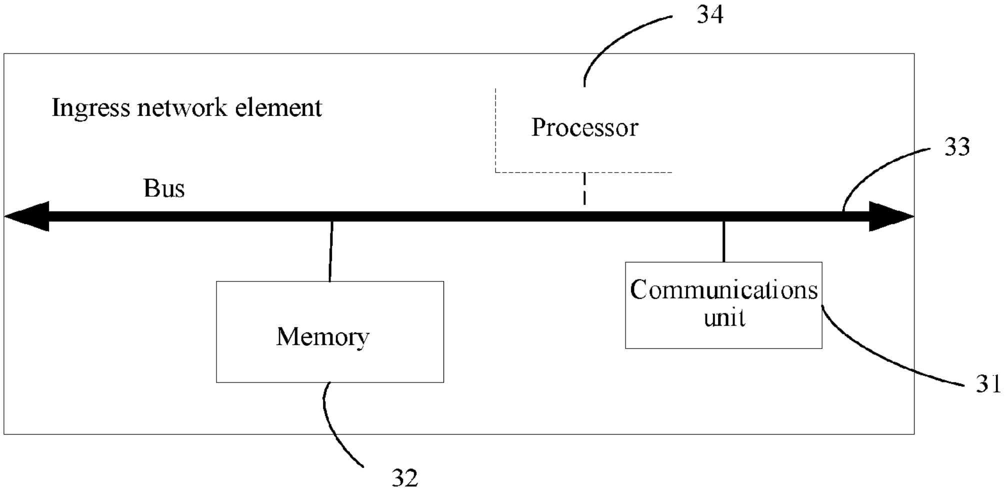
FIG. 14 is a schematic structural diagram of an ingress network element according to another embodiment of the present invention.

As shown in FIG. 14, an embodiment of the present invention provides an ingress network element, configured to implement the foregoing packet processing method. The ingress network element may be implemented by using a packet processing server, and includes: a communications unit 31, a memory 32, and a bus 33. The communications unit 31 and the memory 32 are connected to each other and communicate with each other by using the bus 33, and the memory 32 is configured to store data processed by the communications unit 31.

The communications unit 31 may be a network adapter that works in a full-duplex transmit/receive manner or a transceiver circuit.

The bus 33 may be an ISA (Industry Standard Architecture) bus, a PCI (peripheral component interconnect) bus, an EISA (Extended Industry Standard Architecture) bus, or the like. The bus 33 may be classified into an address bus, a data bus, a control bus, or the like. For ease of representation, only one thick line is used for representation in FIG. 14, but it does not mean that there is only one bus or one type of bus.

The memory 32 is configured to store executable program code, where the program code includes a computer operation instruction. The memory 32 may include a high speed RAM memory, or may include a non-volatile memory, for example, at least one disk memory.

The communications unit 31 is configured to receive a data packet, and send the data packet received by the communications unit 31 to a processing network element according to an ingress flow entry, so that the processing network element performs context processing on the data packet, where the ingress flow entry includes flow description information and a processing network element indication, the flow description information matches the data packet, and the processing network element indication is used to indicate the processing network element that processes the data packet after the ingress network element.

Optionally, the ingress flow entry further includes an encapsulation flow identifier, where the encapsulation flow identifier is used to identify a service flow to which the data packet belongs.

The ingress network element further includes: a processor 34 connected to the bus, where the processor 34 may be a central processing unit (CPU for short), or may be an application-specific integrated circuit (ASIC for short), or may be configured as one or more integrated circuits that implement the embodiments of the present invention.

The processor 34 is configured to attach the encapsulation flow identifier to the data packet, so that the processing network element acquires the encapsulation flow identifier from the data packet, acquires a processing flow entry according to the encapsulation flow identifier, and performs the context processing on the data packet according to the processing flow entry.

Optionally, the ingress flow entry further includes an ingress encapsulation indication, where the ingress encapsulation indication is used to indicate attaching the encapsulation flow identifier to the data packet. The processor 34 is configured to attach the encapsulation flow identifier to the data packet according to the ingress encapsulation indication.

Optionally, the ingress flow entry is locally configured or sent by a control network element, where the control network element is configured to control forwarding or processing performed by the ingress network element on the data packet.

Optionally, the processing network element indication includes a context processing indication list, where the context processing indication list includes the context processing indication. The processor 34 is configured to attach the context processing indication list to the data packet. The communications unit 31 is configured to determine that next context processing to be performed on the data packet is the context processing indicated by the context processing indication, and send the data packet to the processing network element according to a correspondence between the context processing indication and the processing network element.

Optionally, the context processing indication list further includes addressing information of the processing network element, where the context processing indication corresponds to the addressing information of the processing network element. The communications unit 31 is configured to send the data packet to the processing network element according to the addressing information, which corresponds to the context processing indication, of the processing network element.

Optionally, the ingress flow entry is locally configured or sent by a control network element, where the control network element is configured to control forwarding performed by the ingress network element on the data packet.

Further, optionally, the ingress flow entry further includes an ingress context processing indication, where the ingress context processing indication is used to indicate context processing performed on the data packet. The processor 34 is configured to perform the context processing on the data packet according to the ingress context processing indication.

According to the ingress network element provided in this embodiment of the present invention, a packet is forwarded to different network elements for context processing, so that context processing can be performed on the packet by using distributed forwarding plane devices, so as to improve load balance during the context processing of the network packet.

Figure 15:
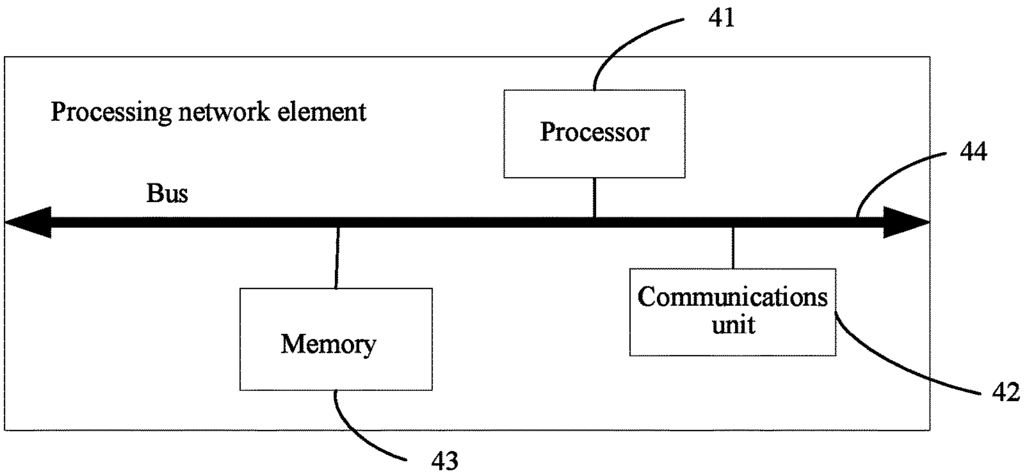
FIG. 15 is a schematic structural diagram of a processing network element according to another embodiment of the present invention.

Referring to FIG. 15, an embodiment of the present invention provides a processing network element, configured to implement the foregoing packet processing method. The processing network element may be implemented by using a packet processing server, and includes: a processor 41, a communications unit 42, a memory 43, and a bus 44. The processor 41, the communications unit 42, and the memory 43 are connected to each other and communicate with each other by using the bus 44. The memory 43 is configured to store program code processed by the processor 41.

The communications unit 42 may be a network adapter that works in a full-duplex transmit/receive manner or a transceiver circuit.

The bus 44 may be an ISA (Industry Standard Architecture) bus, a PCI (peripheral component interconnect) bus, an EISA (Extended Industry Standard Architecture) bus, or the like. The bus 44 may be classified into an address bus, a data bus, a control bus, or the like. For ease of representation, only one thick line is used for representation in FIG. 15, but it does not mean that there is only one bus or one type of bus.

The memory 43 is configured to store executable program code, where the program code includes a computer operation instruction. The memory 43 may include a high speed RAM memory, or may include a non-volatile memory, for example, at least one disk memory.

The processor 41 may be a central processing unit (CPU for short), or may be an application-specific integrated circuit (ASIC for short), or may be configured as one or more integrated circuits that implement the embodiments of the present invention.

The communications unit 42 is configured to receive a data packet. The processor 41 is configured to perform, according to a context processing indication, context processing on the data packet received by the communications unit 42, where the context processing indication is used to indicate the context processing performed on the data packet.

Optionally, the processor 41 is configured to acquire an encapsulation flow identifier from the data packet, acquire a processing flow entry according to the encapsulation flow identifier, and perform the context processing on the data packet according to the processing flow entry, where the encapsulation flow identifier is used to identify a service flow to which the data packet belongs, the processing flow entry includes a match flow identifier and the context processing indication, and the match flow identifier matches the encapsulation flow identifier.

Optionally, when the processed data packet does not include the encapsulation flow identifier, the processor 41 is further configured to attach a flow identifier to the processed data packet, where the flow identifier is the encapsulation flow identifier, or when the processing flow entry further includes a new encapsulation flow identifier, the flow identifier is the new encapsulation flow identifier.

Optionally, the processing flow entry further includes a processing encapsulation indication; the processing encapsulation indication is used to indicate attaching the flow identifier to the processed data packet. The processor 41 is configured to attach the flow identifier to the processed data packet according to the processing encapsulation indication.

When the processing flow entry does not include a reprocessing network element indication, the communications unit 42 sends the data packet processed by the processor 41 to the outside of the packet processing system; or when the processing flow entry further includes a reprocessing network element indication, the communications unit 42 sends the data packet processed by the processor 41 to a next processing network element according to the reprocessing network element indication, where the reprocessing network element indication is used to indicate the next processing network element that processes the data packet after the processing network element.

Optionally, the processing flow entry is locally configured or sent by a control network element, where the control network element is configured to control forwarding or processing performed by the processing network element on the data packet.

Optionally, the processor 41 is configured to acquire a context processing indication list from the data packet, and perform the context processing on the data packet according to the context processing indication, where the context processing indication list includes the context processing indication.

When the context processing indication list does not include another context processing indication, the communications unit 42 sends the data packet processed by the processor 41 to the outside; or when the context processing indication list further includes another context processing indication, the communications unit 42 determines that next context processing to be performed on the data packet is context processing indicated by the another context processing indication, and after the processor 41 performs the context processing on the data packet, sends the data packet processed by the processor 41 to another processing network element according to a correspondence between the another context processing indication and the another processing network element, where the another context processing indication is used to indicate the context processing performed on the data packet.

Optionally, the context processing indication list further includes addressing information of the another processing network element, where the another context processing indication corresponds to the addressing information of the another processing network element. The communications unit 42 is configured to send the data packet processed by the processor to the another processing network element according to the addressing information, which corresponds to the another context processing indication, of the another processing network element.

According to the processing network element provided in this embodiment of the present invention, a packet is forwarded to different network elements for context processing, so that context processing can be performed on the packet by using distributed forwarding plane devices, so as to improve load balance during the context processing of the network packet.

With descriptions of the foregoing embodiments, a person skilled in the art may clearly understand that embodiments of the present invention may be implemented by hardware, firmware or a combination thereof. When embodiments of the present invention are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM (random access memory), a ROM (read-only memory), an eeprom (electrically erasable programmable read-only memory), a CD-ROM (compact disc read-only memory) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a DSL (digital subscriber line) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and a disc used by embodiments of the present invention includes a CD (compact disc), a laser disc, an optical disc, a DVD disc (digital versatile disc), a floppy disk and a Blu-ray disc, where the disk generally copies data by a magnetic means, and the disc copies data optically by a laser means. The foregoing combination should also be included in the protection scope of the computer-readable medium.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet processing system, comprising:

a plurality of processing network elements; and an ingress network element in the packet processing system with the plurality of processing network elements;

wherein the ingress network element is configured to receive a data packet from outside of the packet processing system, and to perform packet matching on the packet only once, by sending the data packet to one of the plurality of processing network elements for processing, according to an ingress flow entry;

wherein the ingress flow entry comprises flow description information, a processing network element indication, an encapsulation flow identifier, and an ingress encapsulation indication, wherein the flow description information matches the data packet, wherein the processing network element indication identifies which of the plurality of processing network elements is an initial processing network element in the packet processing system that receives the data packet from the ingress network element, wherein the encapsulation flow identifier identifies a service flow to which the data packet belongs, wherein the ingress encapsulation indication indicates an attachment of the encapsulation flow identifier to the data packet, and wherein the ingress network element is configured to attach the encapsulation flow identifier to the data packet according to the ingress encapsulation indication;

wherein the initial processing network element is configured to:

receive the data packet from the ingress network element;

perform an initial context processing on the data packet according to an initial context processing indication applicable to the initial processing network element;

determine whether there is a next context processing to be performed on the data packet, according to whether there is a next context processing indication;

when it is determined that there is the next context processing to be performed, determine which, of other processing network elements of the plurality of processing network elements, is a next processing network element, according to the next context processing to be performed on the data packet, as identified by the next context processing indication applicable to the next context processing, and forward the data packet to the next processing network element in the packet processing system; and when it is determined that the initial context processing is a last context processing to be performed on the data packet, sending the data packet back to the outside of the packet processing system;

wherein the next processing network element is configured to receive the data packet from the initial processing network element, and to perform the next context processing on the data packet according to the next context processing indication applicable to the next processing network element; and wherein a last processing network element, of the plurality of processing network elements, performs the last context processing on the data packet and sends the data packet back to the outside of the packet processing system.

2. The packet processing system according to claim 1, wherein:

the initial processing network element is configured to acquire the encapsulation flow identifier from the data packet, acquire a processing flow entry according to the encapsulation flow identifier, and perform the initial context processing on the data packet according to the processing flow entry; and the processing flow entry comprises a match flow identifier and the initial context processing indication, and the match flow identifier matches the encapsulation flow identifier.

3. The packet processing system according to claim 2, wherein the initial processing network element is further configured to attach a flow identifier to a processed data packet either when the encapsulation flow identifier is absent from the processed data packet, or when the processing flow entry comprises a new encapsulation flow identifier;

wherein, when the encapsulation flow identifier is absent from the processed data packet, the flow identifier that is attached to the processed data packet is the encapsulation flow identifier, and wherein the processed data packet comprises the data packet after the initial context processing is performed on the data packet by the initial processing network element; and wherein, when the processing flow entry comprises the new encapsulation flow identifier, the flow identifier that is attached to the processed data packet is the new encapsulation flow identifier.

4. The packet processing system according to claim 3, wherein the processing flow entry further comprises a processing encapsulation indication, the processing encapsulation indication indicating an attachment of the flow identifier to the processed data packet, and wherein the initial processing network element is further configured to attach the flow identifier to the processed data packet according to the processing encapsulation indication.

5. The packet processing system according to claim 1, wherein the processing network element indication comprises a context processing indication list, wherein the context processing indication list comprises a context processing indication for each of the plurality of processing network elements;

wherein the ingress network element is configured to attach the context processing indication list to the data packet, determine which type of context processing is to be performed on the data packet according to the initial context processing indicated by the context processing indication, and identify the initial processing network element and send the data packet to the initial processing network element, according to a correspondence between the context processing indication and which of the plurality of processing network elements performs the type of context processing that is the initial context processing; and wherein the initial processing network element is configured to acquire the context processing indication list from the data packet, and perform the initial context processing on the data packet according to the context processing indication.

6. The packet processing system according to claim 5, wherein the context processing indication list further comprises addressing information of each of the initial processing network element and the next processing network element, wherein the context processing indication of the initial processing network element corresponds to the addressing information of the initial processing network element, and the context processing indication of the next processing network element corresponds to the addressing information of the next processing network element; and wherein the ingress network element is configured to send the data packet to the initial processing network element according to the addressing information that corresponds to the context processing indication applicable to the initial processing network element.

7. An ingress network element, comprising:

a receiving unit configured to receive a data packet;

a processing unit connected to the receiving unit; and a sending unit connected to the processing unit, wherein the sending unit is configured to perform packet matching only once on the data packet received by the receiving unit, by sending the data packet to an initial processing network element of a plurality of processing network elements for processing, as identified by the processing unit;

wherein the processing unit identifies, according to an ingress flow entry that identifies which, of the plurality of processing network elements in a packet processing system with the ingress network element, is the initial processing network element;

wherein the initial processing network element that receives the data packet:

performs an initial context processing on the data packet;

determines whether there is a next context processing to be performed on the data packet, according to whether there is a next context processing indication; and when the initial processing network element determines that there is the next context processing to be performed, determine which, of other processing network elements of the plurality of processing network elements, is a next processing network element, according to the next context processing to be performed on the data packet, as identified by the next context processing indication applicable to the next context processing, and forward the data packet to the next processing network element, causing the next processing network element that receives the data packet from the initial processing network element to perform the next context processing on the data packet;

wherein the ingress flow entry comprises flow description information, an initial processing network element indication, an encapsulation flow identifier, and an ingress encapsulation indication, wherein the flow description information matches the data packet, and wherein the initial processing network element indication identifies the initial processing network element that processes the data packet after receiving the data packet from the ingress network element, wherein the encapsulation flow identifier identifies a service flow to which the data packet belongs, wherein the ingress encapsulation indication indicates an attachment of the encapsulation flow identifier to the data packet, and wherein the ingress network element is further configured to attach the encapsulation flow identifier to the data packet according to the ingress encapsulation indication; and wherein, after a last context processing is performed on the data packet, the data packet is sent back outside of the packet processing system by a network processing element that, of the plurality of processing network elements, performs the last context processing on the data packet.

8. The ingress network element according to claim 7, wherein the ingress network element further comprises a flow identifier encapsulation unit connected to the processing unit, and wherein the flow identifier encapsulation unit is configured to attach the encapsulation flow identifier to the data packet, causing the initial processing network element to: acquire the encapsulation flow identifier from the data packet, acquire a processing flow entry according to the encapsulation flow identifier, and perform the initial context processing on the data packet according to the processing flow entry.

9. The ingress network element according to claim 8, wherein the ingress flow entry is locally configured or sent by a control network element, and wherein the control network element is configured to control forwarding or processing performed by the ingress network element on the data packet.

10. The ingress network element according to claim 7, wherein the initial processing network element indication comprises a context processing indication list, wherein the context processing indication list comprises a context processing indication for each of the plurality of processing network elements, wherein the context processing indication indicates which of the initial context processing and the next context processing is to be performed on the data packet;

wherein the ingress network element further comprises a processing indication attaching unit connected to the processing unit, wherein the processing indication attaching unit is configured to attach the context processing indication list to the data packet; and wherein the processing unit is further configured to determine which type of context processing is to be performed on the data packet according to the initial context processing indicated by the context processing indication, and identify the initial processing network element and send the data packet to the initial processing network element, according to a correspondence between the context processing indication and which of the plurality of processing network elements performs the type of context processing that is the initial context processing.

11. The ingress network element according to claim 10, wherein the context processing indication list further comprises addressing information of each of the initial processing network element and the next processing network element, wherein the context processing indication of the initial processing network element corresponds to the addressing information of the initial processing network element, and the context processing indication of the next processing network element corresponds to the addressing information of the next processing network element; and wherein the sending unit is configured to send the data packet to the initial processing network element according to the addressing information that corresponds to the context processing indication applicable to the initial processing network element.

12. A processing network element, comprising:

a processor; and a non-transitory computer-readable storage medium storing a program to be executed by the processor, the program including instructions for:

receiving from an ingress network element, a data packet that is received by the ingress network element from outside of a packet processing system, and that has packet matching performed only once by the ingress network element, by being sent by the ingress network element to the processing network element that is identified, in an ingress flow entry, as an initial processing network element in a plurality of processing network elements in the packet processing system, wherein the ingress flow entry comprises flow description information, a processing network element indication, an encapsulation flow identifier, and an ingress encapsulation indication, wherein the flow description information matches the data packet, wherein the processing network element indication identifies which of the plurality of processing network elements is the initial processing network element in the packet processing system that receives the data packet from the ingress network element, wherein the encapsulation flow identifier identifies a service flow to which the data packet belongs, wherein the ingress encapsulation indication indicates an attachment of the encapsulation flow identifier to the data packet, and wherein the encapsulation flow identifier is attached to the data packet according to the ingress encapsulation indication;

performing, according to an initial context processing indication, an initial context processing on the data packet received from the ingress network element, and generating a processed data packet;

determining whether there is a next context processing to be performed on the processed data packet, according to whether there is a next context processing indication; and when it is determined that there is the next context processing to be performed, determining which, of other processing network elements of the plurality of processing network elements, is a next processing network element, according to the next context processing to be performed on the processed data packet, as identified by the next context processing indication applicable to the next context processing, and forwarding the processed data packet to the next processing network element to perform the next context processing on the processed data packet; and when it is determined that the initial context processing is a last context processing to be performed on the processed data packet, sending the processed data packet back to the outside of the packet processing system;

wherein an initial type of context processing to be performed on the data packet is indicated by the initial context processing indication, and a next type of context processing to be performed on the processed data packet is indicated by the next context processing indication; and wherein, when the last context processing is performed by another network processing element of the plurality of processing network elements, the another network processing element sends the processed data packet back to the outside of the packet processing system after performing the last context processing on the processed data packet.

13. The processing network element according to claim 12, wherein the program further includes instructions for:

acquiring the encapsulation flow identifier from the data packet; and acquiring a processing flow entry according to the encapsulation flow identifier;

wherein the instructions for performing the initial context processing on the data packet comprise instructions for performing the initial context processing on the data packet according to the processing flow entry; and wherein the processing flow entry comprises a match flow identifier and the initial context processing indication, and the match flow identifier matches the encapsulation flow identifier.

14. The processing network element according to claim 13, wherein the program further includes instructions for attaching a flow identifier to the processed data packet either when the encapsulation flow identifier is absent from the processed data packet, or when the processing flow entry comprises a new encapsulation flow identifier;

wherein, when the encapsulation flow identifier is absent from the processed data packet, the flow identifier that is attached to the processed data packet is the encapsulation flow identifier; and where, when the processing flow entry comprises the new encapsulation flow identifier, the flow identifier that is attached to the processed data packet is the new encapsulation flow identifier.

15. The processing network element according to claim 14, wherein the processing flow entry further comprises a processing encapsulation indication, wherein the processing encapsulation indication indicates an attachment of the flow identifier to the processed data packet, and wherein the instructions for attaching the flow identifier to the processed data packet include instructions for attaching the flow identifier to the processed data packet according to the processing encapsulation indication.

16. The processing network element according to claim 12, wherein the program further includes instructions for acquiring a context processing indication list from the data packet, wherein the context processing indication list comprises the initial context processing indication and the next context processing indication.

17. The processing network element according to claim 16, wherein the instructions for determining which is the next processing network element comprise instructions for:

determining that next context processing to be performed on the processed data packet is context processing indicated by the next context processing indication on the context processing indication list; and identifying the next processing network element according to a correspondence between the next context processing indication and the next processing network element, wherein the next context processing indication indicates the next context processing to be performed by the next processing network element on the processed data packet.

18. The processing network element according to claim 17, wherein the context processing indication list further comprises addressing information of the next processing network element, wherein the next context processing indication corresponds to the addressing information of the next processing network element, and wherein the instructions for determining which is the next processing network element comprises instructions for identifying the next processing network element according to the addressing information, which corresponds to the next context processing indication, of the next processing network element.

* * * * *